US012759582B2

(12) United States Patent
Topan et al.

(10) Patent No.: US 12,759,582 B2
(45) Date of Patent: Oct. 13, 2026

(54) CONTEXT-AWARE PERCEPTION

(71) Applicant: NVIDIA Corporation, Santa Clara, CA (US)

(72) Inventors: Sever Ioan Topan, San Francisco, CA (US); Yuxiao Chen, Newark, CA (US); Edward Fu Schmerling, Seattle, WA (US); Karen Yan Ming Leung, Seattle, WA (US); Hans Jonas Nilsson, Los Gatos, CA (US); Michael Cox, Menlo Park, CA (US); Marco Pavone, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 130 days.

(21) Appl. No.: 18/328,007

(22) Filed: Jun. 2, 2023

(65) Prior Publication Data

US 2024/0400101 A1 Dec. 5, 2024

(51) Int. Cl.
*B60W 60/00* (2020.01)

(52) U.S. Cl.
CPC ... *B60W 60/0015* (2020.02); *B60W 2420/403* (2013.01); *B60W 2554/4049* (2020.02)

(58) Field of Classification Search
CPC ....... B60W 60/0015; B60W 2420/403; B60W 2554/4049
See application file for complete search history.

(56) References Cited

U.S. PATENT DOCUMENTS 11,435,199 B2 * 9/2022 Lermusiaux ....... G01C 21/3469
2019/0318177 A1 * 10/2019 Steinberg .............. G01S 17/931
(Continued)

FOREIGN PATENT DOCUMENTS

WO WO-2023006709 A1 * 2/2023 ............ B60W 30/09

OTHER PUBLICATIONS

Topan, Sever, et al. "Interaction-Dynamics-Aware Perception Zones for Obstacle Detection Safety Evaluation" arXiv. Cornell University. Jun. 24, 2022. DOI: 10.48550/arXiv.2206.12471. (Year: 2022).
(Continued)

*Primary Examiner* — Toya Pettiegrew
(74) *Attorney, Agent, or Firm* — Foley & Lardner LLP

(57) ABSTRACT

In various examples, systems and methods are disclosed relating to refinement of safety zones and improving evaluation metrics for the perception modules of autonomous and semi-autonomous systems. Example implementations can exclude areas in the state space that are not safety critical, while retaining the areas that are safety-critical. This can be accomplished by leveraging ego maneuver information and conditioning safety zone computations on ego maneuvers. A maneuver-based decomposition of perception safety zones may leverage a temporal convolution operation with the capability to account for collision at any intermediate time along the way to maneuver completion. This provides a significant reduction in zone volume while maintaining completeness, thus optimizing or otherwise enhancing obstacle perception performance requirements by filtering out regions of state space not relevant to a system's route of travel. Computation of safety-zones conditioned on the ego maneuver greatly reduces excessive conservatism.

20 Claims, 10 Drawing Sheets

(56) References Cited

U.S. PATENT DOCUMENTS

| | | | | |
|---|---|---|---|---|
| 2020/0086879 | A1* | 3/2020 | Lakshmi Narayanan | G06N 3/08 |
| 2021/0107532 | A1* | 4/2021 | Zhao | G06V 10/764 |
| 2021/0312199 | A1* | 10/2021 | Hashimoto | G05D 1/0246 |
| 2022/0169245 | A1* | 6/2022 | Hieida | G08G 1/162 |
| 2023/0103178 | A1* | 3/2023 | Li | G01S 7/295 701/23 |
| 2024/0067168 | A1* | 2/2024 | Kuroda | B60W 60/0015 |
| 2024/0157976 | A1* | 5/2024 | Heo | B60W 60/0016 |

OTHER PUBLICATIONS

A. Bansal, J. Singh, M. Verucchi, M. Caccamo, and L. Sha, "Risk Ranked Recall: Collision Safety Metric for Object Detection Systems in Autonomous Vehicles," in Mediterranean Conf. on Embedded Computing, 2021.

A. Girard, "Reachability of uncertain linear systems using zonotopes," in Hybrid Systems: Computation and Control, 2005.

A. Kurzhanski and P. Varaiya, "Ellipsoidal techniques for reachability analysis: internal approximation," Systems & Control Letters, vol. 41, No. 3, pp. 201-2011, 2000.

A. Majumdar and R. Tedrake, "Funnel libraries for real-time robust feedback motion planning," Int. Journal of Robotics Research, vol. 36, No. 8, pp. 947-982, 2017.

D. Nistér, H.-L. Lee, J. Ng, and Y. Wang, "An Introduction to the Safety Force Field," https://www.nvidia.com/content/dam/en-zz/Solutions/self-driving-cars/safety-force-field/the-safety-force-field.pdf, 2019.

G. Volk, J. Gamerdinger, A. von Bernuth, and O. Bringmann, "A Comprehensive Safety Metric to Evaluate Perception in Autonomous Systems," in Proc. IEEE Int. Conf. on Intelligent Transportation Systems, 2020.

H. Yazarel and G. Pappas, "Geometric programming relaxations for linear system reachability," in American Control Conference, 2004.

I. M. Mitchell, A. M. Bayen, and C. J. Tomlin, "A time-dependent Hamilton-Jacobi formulation of reachable sets for continuous dynamic games," IEEE Transactions on Automatic Control, vol. 50, No. 7, pp. 947-957, 2005.

International Organization for Standardization, "ISO 26262:2018: Road Vehicles-Functional Safety," https://www.iso.org/standard/68391.html, 2018.

J. Borquez, K. Nakamura, and S. Bansal. (2022) Parameter-conditioned reachable sets for updating safety assurances online. Available at https://arxiv.org/abs/2209.14976.

J. Van den Berg, M. Lin, and D. Manocha, "Reciprocal velocity obstacles for real-time multi-agent navigation," in Proc. IEEE Conf. on Robotics and Automation, 2008.

K. Leung, E. Schmerling, M. Zhang, M. Chen, J. Talbot, J. C. Gerdes, and M. Pavone, "On infusing reachability-based safety assurance within planning frameworks for human-robot vehicle interactions," Int. Journal of Robotics Research, vol. 39, No. 10-11, pp. 1326-1345, 2020.

K. Margellos and J. Lygeros, "Hamilton-Jacobi formulation for reach-avoid differential games," IEEE Transactions on Automatic Control, vol. 56, No. 8, pp. 1849-1861, 2011.

K. Nakamura and S. Bansal. (2022) Online update of safety assurances using confidence-based predictions. Available at https://arxiv.org/abs/2210.01199.

M. Althoff and J. M. Dolan, "Online verification of automated road vehicles using reachability analysis," IEEE Transactions on Robotics, vol. 30, No. 4, pp. 903-918, 2014.

M. Althoff and J. M. Dolan, "Set-based computation of vehicle behaviors for the online verification of autonomous vehicles," in Proc. IEEE Int. Conf. on Intelligent Transportation Systems, 2011.

M. Althoff, O. Stursberg, and M. Buss, "Reachability analysis of nonlinear systems with uncertain parameters using conservative linearization," in Proc. IEEE Conf. on Decision and Control, 2008.

M. Chen, Q. Tam, S. C. Livingston, and M. Pavone, "Signal Temporal Logic meets Hamiltonian-Jacobi reachability: Connections and applications," in Workshop on Algorithmic Foundations of Robotics, 2018.

P. Trautman and A. Krause, "Unfreezing the robot: Navigation in dense, interacting crowds," in IEEE/RSJ Int. Conf. on Intelligent Robots & Systems, 2010.

R. Tian, L. Sun, A. Bajcsy, M. Tomizuka, and A. D. Dragan, "Safety assurances for human-robot interaction via confidence-aware game-theoretic human models," in Proc. IEEE Conf. on Robotics and Automation, 2022.

S. Bansal and C. Tomlin, "DeepReach: A deep learning approach to high-dimensional reachability," in Proc. IEEE Conf. on Robotics and Automation, 2021.

S. Bansal, M. Chen, S. Herbert, and C. J. Tomlin, "Hamilton-Jacobi reachability: A brief overview and recent advances," in Proc. IEEE Conf. on Decision and Control, 2017.

S. Shalev-Shwartz, S. Shammah, and A. Shashua. (2017) On a formal model of safe and scalable self-driving cars. Available at https://arxiv.org/abs/1708.06374.

S. Topan, K. Leung, Y. Chen, P. Tupekar, E. Schmerling, J. Nilsson, M. Cox, and M. Pavone, "Interaction-Dynamics-Aware Perception Zones for Obstacle Detection Safety Evaluation," in IEEE Intelligent Vehicles Symposium, 2022.

X. Wang, K. Leung, and M. Pavone, "Infusing reachability-based safety into planning and control for multi-agent interactions," in IEEE/RSJ Int. Conf. on Intelligent Robots & Systems, 2020.

* cited by examiner

CONTEXT-AWARE PERCEPTION

BACKGROUND

An electronic system may obtain information about its surroundings and use that information in performing one or more operations. With the exception of certain highly-controlled environments, electronic systems do not generally know in advance how every potential object in the system's surroundings will change state or position relative to the system over time. Electronic systems may thus make predictions about such changes to be able to make suitable adjustments to the electronic system's operations as needed for maintaining safety. As an example, vehicle perception systems may make predictions about future state or position changes of objects in order to anticipate and avoid potential collisions.

SUMMARY

Embodiments of the present disclosure relate to generating obstacle perception safety zones informed by maneuvers. For example, systems and methods are disclosed that enable refining obstacle perception safety zones via maneuver-based decomposition.

More refined computations of safety zones improve the evaluation metrics for the perception modules of autonomous and semi-autonomous systems. Conventional approaches used simplified heuristics to identify objects as safety-critical or non-safety-critical, but such systems are not informed by dynamics and have significant rates of misclassification. Prior approaches introduced a level of conservatism (e.g., for completeness) into constructing safety zones that resulted in safety zones that were larger than necessary (e.g., for soundness). The disclosed approach improves upon prior systems by enhancing the soundness of safety zones while maintaining their completeness. For example, the disclosed approach can exclude areas in the state space that are not safety critical, while retaining the areas that are safety-critical. This can be accomplished by, for example, leveraging the ego's maneuver information and conditioning the safety zone computation on this information. A maneuver-based decomposition of perception safety zones may leverage a temporal convolution operation with the capability to account for collision at any intermediate time along the way to maneuver completion. This provides a significant reduction in zone volume while maintaining completeness, thus optimizing or otherwise enhancing obstacle perception performance requirements by filtering out regions of state space not relevant to a system's route of travel. The disclosed approach provides a time-convolution operation that can compute reachable zones of the form "the agent satisfies condition A at some point within the horizon and then proceeds to satisfy condition B by the end of the horizon." This enables computation of safety-zones conditioned on the ego maneuver, thus greatly reducing the excessive conservatism of prior approaches.

In example implementations, the disclosed approach refines interaction-dynamics-aware perception zones by equipping Hamilton-Jacobi (HJ)-reachability formulations with AV maneuver constraints, thus producing tighter maneuver-conditioned zones without introducing safety blind spots. The computation of these maneuver-aware perception zones through the disclosed temporal convolution operation enables modeling of temporal dependencies between state goals (e.g., potential collision before maneuver completion). The constrained maneuver-aware perception zones significantly improve zone soundness while maintaining completeness.

A prototypical use case of safety zones is evaluation of an obstacle perception system. Depending on how a given system's safety-critical failures are distributed over state space, a reduction in zone volume implies a commensurate reduction in safety-critical failures which warrant investigation during V&V. The significantly smaller, equally complete safety zones that are demonstrated in this disclosure make stringent autonomous vehicle perception performance targets easier to achieve by providing a more precise definition of obstacle safety-criticality.

At least one aspect relates to a processor. The processor may be, or may comprise, one or more circuits to: obtain sensor data corresponding to one or more objects perceivable by an autonomous system; and generate, based at least on the sensor data and an intended maneuver of at least one of the autonomous system or the one or more objects, an obstacle perception zone corresponding to a volume of space containing potential threats to the autonomous system.

In various embodiments, the obstacle perception zone is generated, at least in part, by performing temporal convolution that models temporal dependencies between state goals. In various embodiments, the temporal dependencies correspond to potential collisions during the intended maneuver. In various embodiments, the obstacle perception zone is generated so as to account for a collision at any intermediate time along the way to maneuver completion. In various embodiments, the obstacle perception zone is generated, at least in part, using a Hamilton-Jacobi (HJ) reachability formulation constrained by the intended maneuver. In various embodiments, the obstacle perception zone is generated, at least in part, by executing a Hamilton-Jacobi-Bellman (HJB) equation. In various embodiments, the obstacle perception zone is generated, at least in part, by filtering out regions of space not relevant to a route of the autonomous system. In various embodiments, the obstacle perception zone corresponds to regions of space in which it is possible for the autonomous system to collide with one or more actors. In various embodiments, the intended maneuver comprises a change in position of the autonomous system. In various embodiments, the intended maneuver comprises a change in direction of the autonomous system.

At least one other aspect relates to a system. The system may comprise, or consist of, one or more processing units to perform operations comprising: obtaining sensor data corresponding to one or more objects perceivable by a machine; and generating, based at least on the sensor data and an intended maneuver of at least one of the machine or the one or more objects, an obstacle perception zone corresponding to a volume of space containing potential threats to the machine.

In various embodiments, generating the obstacle perception zone comprises performing temporal convolution that models temporal dependencies between state goals. In various embodiments, the temporal dependencies correspond to potential collisions during the intended maneuver. In various embodiments, the obstacle perception zone is determined so as to account for a collision at any intermediate time along the way to maneuver completion. In various embodiments, generating the obstacle perception zone comprises a Hamilton-Jacobi (HJ) reachability formulation constrained by the intended maneuver. In various embodiments, generating the obstacle perception zone based at least on the intended maneuver comprises filtering out regions of space not relevant to a route of the machine.

At least one other aspect relates to a method. The method may comprise, or consist of, processing, using one or more processing units of a machine, sensor data corresponding to one or more objects perceivable by a machine; and generating, using the one or more processing units and based at least on the sensor data and an intended maneuver of the at least one of the machine or the one or more objects, an obstacle perception zone corresponding to a volume of space containing potential threats to the machine.

In various embodiments, generating the obstacle perception zone comprises performing temporal convolution that models temporal dependencies between state goals. In various embodiments, temporal dependencies correspond to potential collisions during the intended maneuver.

In various embodiments, the processors, systems, and/or methods described herein can be implemented by or via, or can be included in, at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for performing conversational AI operations; a system implementing one or more large language models (LLMs); a system for generating synthetic data; a system incorporating one or more virtual machines (VMs); a system implemented at least partially in a data center; or a system implemented at least partially using cloud computing resources.

BRIEF DESCRIPTION OF THE DRAWINGS

The present systems and methods for generating obstacle perception safety zones informed by maneuver are described in detail below with reference to the attached drawing figures, wherein.

DETAILED DESCRIPTION

Figure 1A:
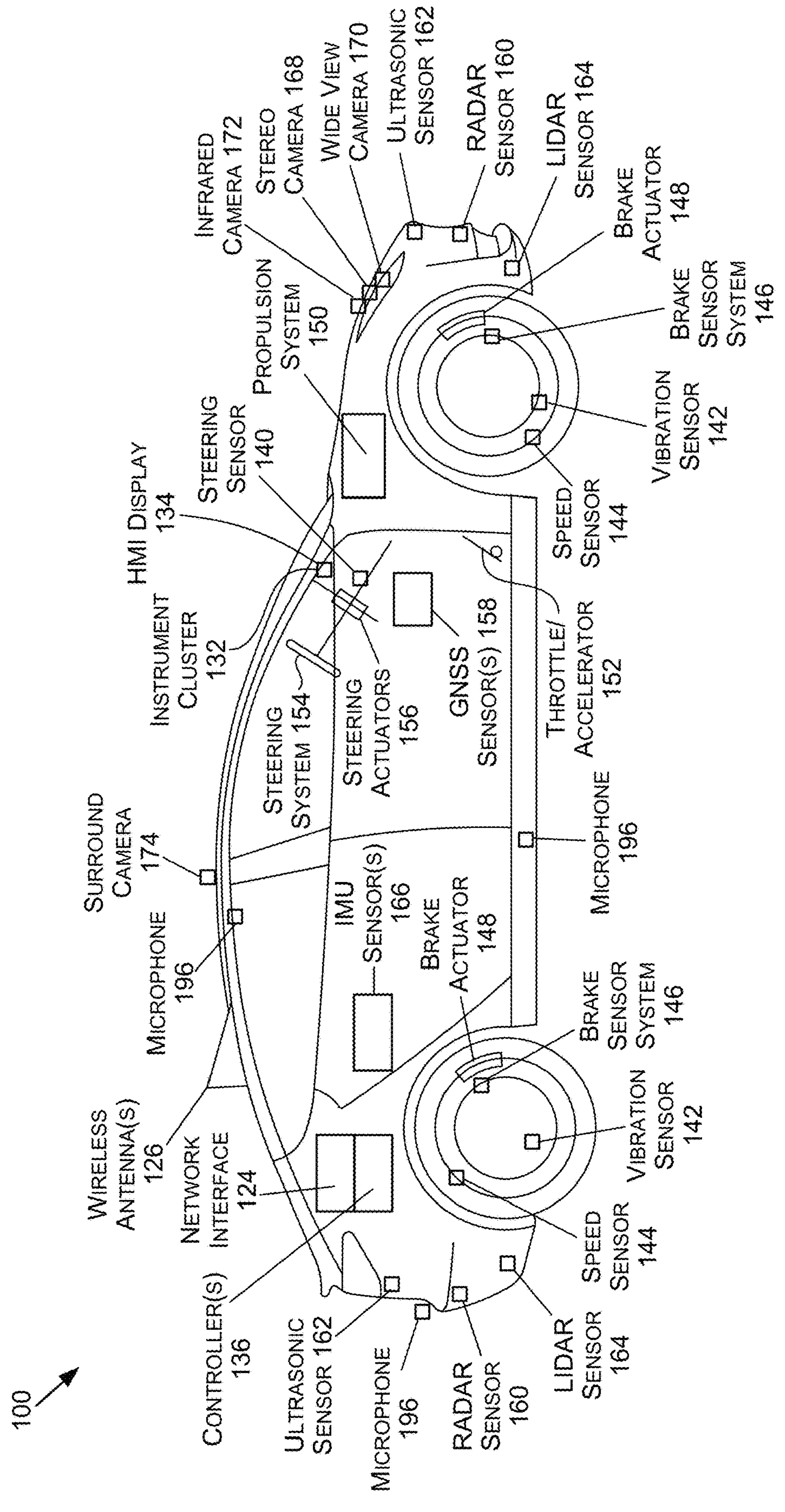
FIG. 1A is an illustration of an example autonomous vehicle, in accordance with at least some embodiments of the present disclosure.

Systems and methods are disclosed related to generating obstacle perception safety zones informed by maneuvers. Although the present disclosure may be described with respect to an example autonomous vehicle 100 (alternatively referred to herein as "vehicle 100" or "ego-machine 100," an example of which is described with respect to FIGS. 1A-1D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to safety determinations by autonomous vehicles, this is not intended to be limiting, and the systems and methods described herein may be used in augmented reality, virtual reality, mixed reality, robotics, security and surveillance, autonomous or semi-autonomous machine applications, and/or any other technology spaces where safety determinations may be involved.

Autonomous or semi-autonomous systems (used interchangeably with "robotic systems") receive sensor data about their environment and use those sensor data to better understand their surroundings. To make more informed decisions about its behavior, a system might evaluate information obtained via the sensors and determine which objects could pose a safety risk to the system. At any point in time, certain regions and objects in the system's surroundings may pose a relatively higher safety risk while certain other regions and objects may pose a relatively lower or virtually no safety risk. It could be computationally very intensive, potentially prohibitively so, for the robotic system to evaluate (and make predictions) based on all data corresponding to all regions of space that are perceivable to the system.

As a result, autonomous or semi-autonomous systems might construct a "safety zone" (used interchangeably with "obstacle perception zone") corresponding to what information (e.g., what regions in space) should be prioritized for identifying safety-critical obstacles and thereby maintaining safety. Making the safety zone larger is more "conservative" (e.g., less likely to miss hazards) in terms of evaluating risk, but requires more computational resources than might be available to the system at any point in time. Refining the process of defining safety zones helps the safety system operate more efficiently so it can safely navigate more potential scenarios than it could otherwise. This can be accomplished by, for example, constructing safety zones that are informed by what actions are to be taken by the system to, for example, help the system "focus" on what is safety-critical (e.g., poses an imminent threat to the autonomous vehicle).

As one example, autonomous vehicles evaluate movements of objects in their surroundings to identify potential safety threats. Evaluating the potential threats posed by all objects perceptible to the sensors of the vehicle would be more computationally intensive than focusing on potential threats in a smaller area, region, or zone that has a smaller "volume" in space (e.g., a smaller amount of three-dimensional physical space in which potential threats are deemed to be most relevant). Reducing the size of a zone that is monitored for threats can thus make threat assessment more efficient. However, simply reducing the size of the region that is monitored, without considering the vehicle's circumstances, would eliminate both relevant (e.g., potentially of concern) and irrelevant (e.g., extremely low or no chance of posing a threat) objects from the safety zone.

A critical task for developing safe autonomous driving stacks is to determine whether an obstacle is safety-critical. For "completeness" (e.g., to capture all safety-critical objects in a scene), safety zones are typically larger than absolutely necessary, forcing the perception module to pay attention to a larger collection of objects for the sake of conservatism. The disclosed approach takes into account the movement of the system in better evaluating "soundness" (e.g., whether all objects within the extent of the zone indeed have the potential to be safety-critical). In example implementations, a maneuver-based decomposition of safety zones leverages information about the ego maneuver to reduce the zone volume. A temporal convolution operation can be employed to produce safety zones for specific ego maneuvers, thus limiting the ego's behavior to reduce the size of the safety zones. Maneuver-based zones are significantly smaller. In potential implementations, interaction-dynamics-aware perception zones are equipped with Hamilton-Jacobi ("HJ") reachability formulations with AV maneuver constraints, thus producing tighter maneuver-conditioned zones without introducing safety blind spots. The computation of these maneuver-aware perception zones by the temporal convolution operation enables modeling of temporal dependencies between state goals (e.g., potential collision before maneuver completion).

With reference to FIG. 1, FIG. 1 is an example autonomous vehicle is depicted as an illustrative multi-sensor system, in accordance with at least some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 100 of FIGS. 1A-1D, example computing device 200 of FIG. 2, and/or example data center 300 of FIG. 3.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, a system implementing one or more large language models (LLMs); systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems Example Autonomous Vehicle FIG. 1A is an illustration of an example autonomous vehicle 100, in accordance with some embodiments of the present disclosure. The autonomous vehicle 100 (alternatively referred to herein as the "vehicle 100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 100 may be capable of functionality in accordance with one or more of Level 3-Level 5 of the autonomous driving levels. The vehicle 100 may be capable of functionality in accordance with one or more of Level 1-Level 5 of the autonomous driving levels. For example, the vehicle 100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 100 or other machine, such as being fully autonomous, being highly autonomous, being conditionally autonomous, being partially autonomous, providing assistive autonomy, being semi-autonomous, being primarily autonomous, or other designation.

The vehicle 100 may include components such as a chassis, a vehicle body, wheels (e.g., 2, 4, 6, 8, 18, etc.), tires, axles, and other components of a vehicle. The vehicle 100 may include a propulsion system 150, such as an internal combustion engine, hybrid electric power plant, an all-electric engine, and/or another propulsion system type. The propulsion system 150 may be connected to a drive train of the vehicle 100, which may include a transmission, to enable the propulsion of the vehicle 100. The propulsion system 150 may be controlled in response to receiving signals from the throttle/accelerator 152.

A steering system 154, which may include a steering wheel, may be used to steer the vehicle 100 (e.g., along a desired path or route) when the propulsion system 150 is operating (e.g., when the vehicle is in motion). The steering system 154 may receive signals from a steering actuator 156. The steering wheel may be optional for full automation (Level 5) functionality.

The brake sensor system 146 may be used to operate the vehicle brakes in response to receiving signals from the brake actuators 148 and/or brake sensors.

Controller(s) 136, which may include one or more system on chips (SoCs) 104 (FIG. 1C) and/or GPU(s), may provide signals (e.g., representative of commands) to one or more components and/or systems of the vehicle 100. For example, the controller(s) may send signals to operate the vehicle brakes via one or more brake actuators 148, to operate the steering system 154 via one or more steering actuators 156, to operate the propulsion system 150 via one or more throttle/accelerators 152. The controller(s) 136 may include one or more onboard (e.g., integrated) computing devices (e.g., supercomputers) that process sensor signals, and output operation commands (e.g., signals representing commands) to enable autonomous driving and/or to assist a human driver in driving the vehicle 100. The controller(s) 136 may include a first controller 136 for autonomous driving functions, a second controller 136 for functional safety functions, a third controller 136 for artificial intelligence functionality (e.g., computer vision), a fourth controller 136 for infotainment functionality, a fifth controller 136 for redundancy in emergency conditions, and/or other controllers. In some examples, a single controller 136 may handle two or more of the above functionalities, two or more controllers 136 may handle a single functionality, and/or any combination thereof.

The controller(s) 136 may provide the signals for controlling one or more components and/or systems of the vehicle 100 in response to sensor data received from one or more sensors (e.g., sensor inputs). The sensor data may be received from, for example and without limitation, global navigation satellite systems ("GNSS") sensor(s) 158 (e.g., Global Positioning System sensor(s)), RADAR sensor(s) 160, ultrasonic sensor(s) 162, LIDAR sensor(s) 164, inertial measurement unit (IMU) sensor(s) 166 (e.g., accelerometer(s), gyroscope(s), magnetic compass(es), magnetometer(s), etc.), microphone(s) 196, stereo camera(s) 168, wide-view camera(s) 170 (e.g., fisheye cameras), infrared camera(s) 172, surround camera(s) 174 (e.g., 360 degree cameras), long-range and/or mid-range camera(s) 198, speed sensor(s) 144 (e.g., for measuring the speed of the vehicle 100), vibration sensor(s) 142, steering sensor(s) 140, brake sensor(s) (e.g., as part of the brake sensor system 146), and/or other sensor types.

One or more of the controller(s) 136 may receive inputs (e.g., represented by input data) from an instrument cluster 132 of the vehicle 100 and provide outputs (e.g., represented by output data, display data, etc.) via a human-machine interface (HMI) display 134, an audible annunciator, a loudspeaker, and/or via other components of the vehicle 100. The outputs may include information such as vehicle velocity, speed, time, map data (e.g., the High Definition ("HD") map 122 of FIG. 1C), location data (e.g., the vehicle's 100 location, such as on a map), direction, location of other vehicles (e.g., an occupancy grid), information about objects and status of objects as perceived by the controller(s) 136, etc. For example, the HMI display 134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 100 further includes a network interface 124 which may use one or more wireless antenna(s) 126 and/or modem(s) to communicate over one or more networks. For example, the network interface 124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 1B:
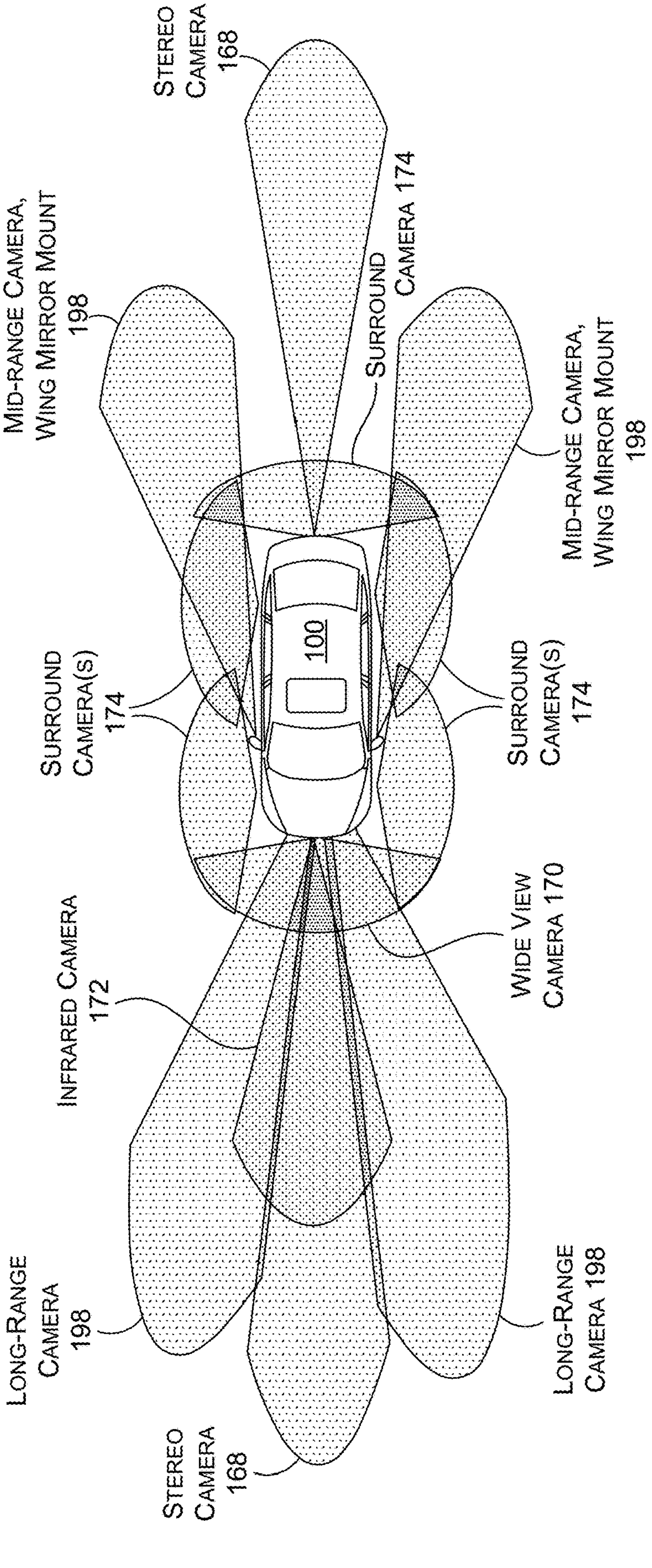
FIG. 1B is an example of camera locations and fields of view for the example autonomous vehicle of FIG. 1A, in accordance with at least some embodiments of the present disclosure.

FIG. 1B is an example of camera locations and fields of view for the example autonomous vehicle 100 of FIG. 1A, in accordance with some embodiments of the present disclosure. The cameras and respective fields of view are one example embodiment and are not intended to be limiting. For example, additional and/or alternative cameras may be included and/or the cameras may be located at different locations on the vehicle 100.

The camera types for the cameras may include, but are not limited to, digital cameras that may be adapted for use with the components and/or systems of the vehicle 100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 100 (e.g., front-facing cameras) may be used for surround view, to help identify forward facing paths and obstacles, as well aid in, with the help of one or more controllers 136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 170 that may be used to perceive objects coming into view from the periphery (e.g., pedestrians, crossing traffic or bicycles). Although only one wide-view camera is illustrated in FIG. 1B, there may be any number (including zero) of wide-view cameras 170 on the vehicle 100. In addition, any number of long-range camera(s) 198 (e.g., a long-view stereo camera pair) may be used for depth-based object detection, especially for objects for which a neural network has not yet been trained. The long-range camera(s) 198 may also be used for object detection and classification, as well as basic object tracking.

Any number of stereo cameras 168 may also be included in a front-facing configuration. In at least one embodiment, one or more of stereo camera(s) 168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 168 may be used in addition to, or alternatively from, those described herein.

Cameras with a field of view that include portions of the environment to the side of the vehicle 100 (e.g., side-view cameras) may be used for surround view, providing information used to create and update the occupancy grid, as well as to generate side impact collision warnings. For example, surround camera(s) 174 (e.g., four surround cameras 174 as illustrated in FIG. 1B) may be positioned to on the vehicle 100. The surround camera(s) 174 may include wide-view camera(s) 170, fisheye camera(s), 360 degree camera(s), and/or the like. Four example, four fisheye cameras may be positioned on the vehicle's front, rear, and sides. In an alternative arrangement, the vehicle may use three surround camera(s) 174 (e.g., left, right, and rear), and may leverage one or more other camera(s) (e.g., a forward-facing camera) as a fourth surround view camera.

Cameras with a field of view that include portions of the environment to the rear of the vehicle 100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 198, stereo camera(s) 168), infrared camera(s) 172, etc.), as described herein.

Figure 1C:
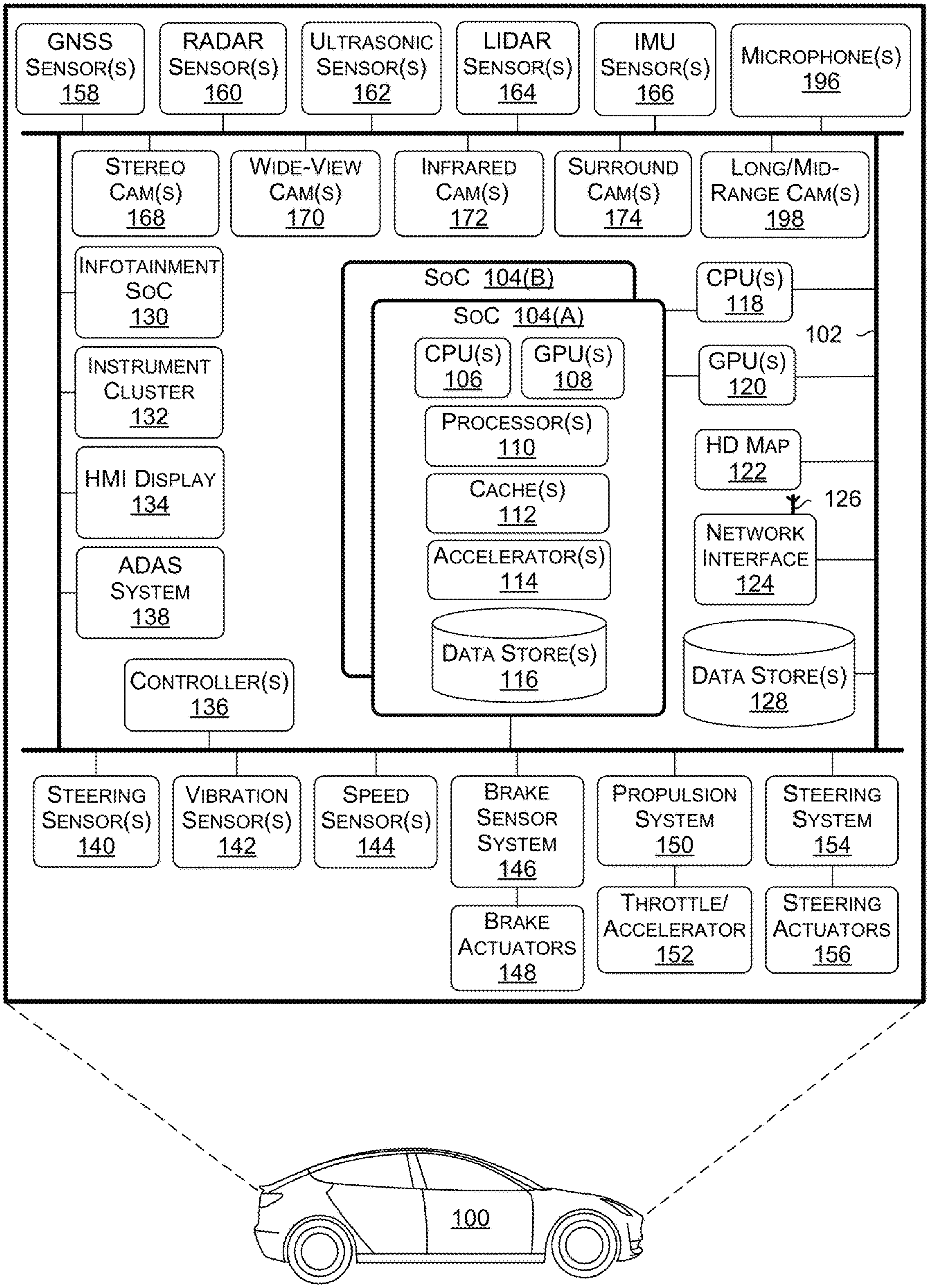
FIG. 1C is a block diagram of an example system architecture for the example autonomous vehicle of FIG. 1A, in accordance with at least some embodiments of the present disclosure.

FIG. 1C is a block diagram of an example system architecture for the example autonomous vehicle 100 of FIG. 1A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 100 in FIG. 1C are illustrated as being connected via bus 102. The bus 102 may include a Controller Area Network (CAN) data interface (alternatively referred to herein as a "CAN bus"). A CAN may be a network inside the vehicle 100 used to aid in control of various features and functionality of the vehicle 100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 102 is described herein as being a CAN bus, this is not intended to be limiting. For example, in addition to, or alternatively from, the CAN bus, FlexRay and/or Ethernet may be used. Additionally, although a single line is used to represent the bus 102, this is not intended to be limiting. For example, there may be any number of busses 102, which may include one or more CAN busses, one or more FlexRay busses, one or more Ethernet busses, and/or one or more other types of busses using a different protocol. In some examples, two or more busses 102 may be used to perform different functions, and/or may be used for redundancy. For example, a first bus 102 may be used for collision avoidance functionality and a second bus 102 may be used for actuation control. In any example, each bus 102 may communicate with any of the components of the vehicle 100, and two or more busses 102 may communicate with the same components. In some examples, each SoC 104, each controller 136, and/or each computer within the vehicle may have access to the same input data (e.g., inputs from sensors of the vehicle 100), and may be connected to a common bus, such the CAN bus.

The vehicle 100 may include one or more controller(s) 136, such as those described herein with respect to FIG. 1A. The controller(s) 136 may be used for a variety of functions. The controller(s) 136 may be coupled to any of the various other components and systems of the vehicle 100, and may be used for control of the vehicle 100, artificial intelligence of the vehicle 100, infotainment for the vehicle 100, and/or the like.

The vehicle 100 may include a system(s) on a chip (SoC) 104. The SoC 104 may include CPU(s) 106, GPU(s) 108, processor(s) 110, cache(s) 112, accelerator(s) 114, data store(s) 116, and/or other components and features not illustrated. The SoC(s) 104 may be used to control the vehicle 100 in a variety of platforms and systems. For example, the SoC(s) 104 may be combined in a system (e.g., the system of the vehicle 100) with an HD map 122 which may obtain map refreshes and/or updates via a network interface 124 from one or more servers (e.g., server(s) 178 of FIG. 1D).

The CPU(s) 106 may include a CPU cluster or CPU complex (alternatively referred to herein as a "CCPLEX"). The CPU(s) 106 may include multiple cores and/or L2 caches. For example, in some embodiments, the CPU(s) 106 may include eight cores in a coherent multi-processor configuration. In some embodiments, the CPU(s) 106 may include four dual-core clusters where each cluster has a dedicated L2 cache (e.g., a 2 MB L2 cache). The CPU(s) 106 (e.g., the CCPLEX) may be configured to support simultaneous cluster operation enabling any combination of the clusters of the CPU(s) 106 to be active at any given time.

The CPU(s) 106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 108 may include an integrated GPU (alternatively referred to herein as an "iGPU"). The GPU(s) 108 may be programmable and may be efficient for parallel workloads. The GPU(s) 108, in some examples, may use an enhanced tensor instruction set. The GPU(s) 108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 108 may include at least eight streaming microprocessors. The GPU(s) 108 may use compute application programming interface(s) (API(s)). In addition, the GPU(s) 108 may use one or more parallel computing platforms and/or programming models (e.g., NVIDIA's CUDA).

The GPU(s) 108 may be power-optimized for best performance in automotive and embedded use cases. For example, the GPU(s) 108 may be fabricated on a Fin field-effect transistor (FinFET). However, this is not intended to be limiting and the GPU(s) 108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 108 to access the CPU(s) 106 page tables directly. In such examples, when the GPU(s) 108 memory management unit (MMU) experiences a miss, an address translation request may be transmitted to the CPU(s) 106. In response, the CPU(s) 106 may look in its page tables for the virtual-to-physical mapping for the address and transmits the translation back to the GPU(s) 108. As such, unified memory technology may allow a single unified virtual address space for memory of both the CPU(s) 106 and the GPU(s) 108, thereby simplifying the GPU(s) 108 programming and porting of applications to the GPU(s) 108.

In addition, the GPU(s) 108 may include an access counter that may keep track of the frequency of access of the GPU(s) 108 to memory of other processors. The access counter may help ensure that memory pages are moved to the physical memory of the processor that is accessing the pages most frequently.

The SoC(s) 104 may include any number of cache(s) 112, including those described herein. For example, the cache(s) 112 may include an L3 cache that is available to both the CPU(s) 106 and the GPU(s) 108 (e.g., that is connected both the CPU(s) 106 and the GPU(s) 108). The cache(s) 112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 104 may include an arithmetic logic unit(s) (ALU(s)) which may be leveraged in performing processing with respect to any of the variety of tasks or operations of the vehicle 100—such as processing DNNs. In addition, the SoC(s) 104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 106 and/or GPU(s) 108.

The SoC(s) 104 may include one or more accelerators 114 (e.g., hardware accelerators, software accelerators, or a combination thereof). For example, the SoC(s) 104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 108 and to off-load some of the tasks of the GPU(s) 108 (e.g., to free up more cycles of the GPU(s) 108 for performing other tasks). As an example, the accelerator(s) 114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 108, and by using an inference accelerator, for example, a designer may target either the DLA(s) or the GPU(s) 108 for any function. For example, the designer may focus processing of CNNs and floating point operations on the DLA(s) and leave other functions to the GPU(s) 108 and/or other accelerator(s) 114.

The accelerator(s) 114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 114 (e.g., the hardware acceleration cluster) may include a computer vision network on-chip and SRAM, for providing a high-bandwidth, low latency SRAM for the accelerator(s) 114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 166 output that correlates with the vehicle 100 orientation, distance, 3D location estimates of the object obtained from the neural network and/or other sensors (e.g., LIDAR sensor (s) 164 or RADAR sensor(s) 160), among others.

The SoC(s) 104 may include data store(s) 116 (e.g., memory). The data store(s) 116 may be on-chip memory of the SoC(s) 104, which may store neural networks to be executed on the GPU and/or the DLA. In some examples, the data store(s) 116 may be large enough in capacity to store multiple instances of neural networks for redundancy and safety. The data store(s) 112 may comprise L2 or L3 cache(s) 112. Reference to the data store(s) 116 may include reference to the memory associated with the PVA, DLA, and/or other accelerator(s) 114, as described herein.

The SoC(s) 104 may include one or more processor(s) 110 (e.g., embedded processors). The processor(s) 110 may include a boot and power management processor that may be a dedicated processor and subsystem to handle boot power and management functions and related security enforcement. The boot and power management processor may be a part of the SoC(s) 104 boot sequence and may provide runtime power management services. The boot power and management processor may provide clock and voltage programming, assistance in system low power state transitions, management of SoC(s) 104 thermals and temperature sensors, and/or management of the SoC(s) 104 power states. Each temperature sensor may be implemented as a ring-oscillator whose output frequency is proportional to temperature, and the SoC(s) 104 may use the ring-oscillators to detect temperatures of the CPU(s) 106, GPU(s) 108, and/or accelerator(s) 114. If temperatures are determined to exceed a threshold, the boot and power management processor may enter a temperature fault routine and put the SoC(s) 104 into a lower power state and/or put the vehicle 100 into a chauffeur to safe stop mode (e.g., bring the vehicle 100 to a safe stop).

The processor(s) 110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 110 may further include a real-time camera engine that may include a dedicated processor subsystem for handling real-time camera management.

The processor(s) 110 may further include a high-dynamic range signal processor that may include an image signal processor that is a hardware engine that is part of the camera processing pipeline.

The processor(s) 110 may include a video image compositor that may be a processing block (e.g., implemented on a microprocessor) that implements video post-processing functions needed by a video playback application to produce the final image for the player window. The video image compositor may perform lens distortion correction on wide-view camera(s) 170, surround camera(s) 174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 108 is not required to continuously render new surfaces. Even when the GPU(s) 108 is powered on and active doing 3D rendering, the video image compositor may be used to offload the GPU(s) 108 to improve performance and responsiveness.

The SoC(s) 104 may further include a mobile industry processor interface (MIPI) camera serial interface for receiving video and input from cameras, a high-speed interface, and/or a video input block that may be used for camera and related pixel input functions. The SoC(s) 104 may further include an input/output controller(s) that may be controlled by software and may be used for receiving I/O signals that are uncommitted to a specific role.

The SoC(s) 104 may further include a broad range of peripheral interfaces to enable communication with peripherals, audio codecs, power management, and/or other devices. The SoC(s) 104 may be used to process data from cameras (e.g., connected over Gigabit Multimedia Serial Link and Ethernet), sensors (e.g., LIDAR sensor(s) 164, RADAR sensor(s) 160, etc. that may be connected over Ethernet), data from bus 102 (e.g., speed of vehicle 100, steering wheel position, etc.), data from GNSS sensor(s) 158 (e.g., connected over Ethernet or CAN bus). The SoC(s) 104 may further include dedicated high-performance mass storage controllers that may include their own DMA engines, and that may be used to free the CPU(s) 106 from routine data management tasks.

The SoC(s) 104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 104 may be faster, more reliable, and even more energy-efficient and space-efficient than conventional systems. For example, the accelerator(s) 114, when combined with the CPU(s) 106, the GPU(s) 108, and the data store(s) 116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 108.

In some examples, a CNN for facial recognition and vehicle owner identification may use data from camera sensors to identify the presence of an authorized driver and/or owner of the vehicle 100. The always on sensor processing engine may be used to unlock the vehicle when the owner approaches the driver door and turn on the lights, and, in security mode, to disable the vehicle when the owner leaves the vehicle. In this way, the SoC(s) 104 provide for security against theft and/or carjacking.

In another example, a CNN for emergency vehicle detection and identification may use data from microphones 196 to detect and identify emergency vehicle sirens. In contrast to conventional systems, that use general classifiers to detect sirens and manually extract features, the SoC(s) 104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 162, until the emergency vehicle(s) passes.

The vehicle may include a CPU(s) 118 (e.g., discrete CPU(s), or dCPU(s)), that may be coupled to the SoC(s) 104 via a high-speed interconnect (e.g., PCIe). The CPU(s) 118 may include an X86 processor, for example. The CPU(s) 118 may be used to perform any of a variety of functions, including arbitrating potentially inconsistent results between ADAS sensors and the SoC(s) 104, and/or monitoring the status and health of the controller(s) 136 and/or infotainment SoC 130, for example.

The vehicle 100 may include a GPU(s) 120 (e.g., discrete GPU(s), or dGPU(s)), that may be coupled to the SoC(s) 104 via a high-speed interconnect (e.g., NVIDIA's NVLINK). The GPU(s) 120 may provide additional artificial intelligence functionality, such as by executing redundant and/or different neural networks, and may be used to train and/or update neural networks based on input (e.g., sensor data) from sensors of the vehicle 100.

The vehicle 100 may further include the network interface 124 which may include one or more wireless antennas 126 (e.g., one or more wireless antennas for different communication protocols, such as a cellular antenna, a Bluetooth antenna, etc.). The network interface 124 may be used to enable wireless connectivity over the Internet with the cloud (e.g., with the server(s) 178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 100 information about vehicles in proximity to the vehicle 100 (e.g., vehicles in front of, on the side of, and/or behind the vehicle 100). This functionality may be part of a cooperative adaptive cruise control functionality of the vehicle 100.

The network interface 124 may include a SoC that provides modulation and demodulation functionality and enables the controller(s) 136 to communicate over wireless networks. The network interface 124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 100 may further include data store(s) 128 which may include off-chip (e.g., off the SoC(s) 104) storage. The data store(s) 128 may include one or more storage elements including RAM, SRAM, DRAM, VRAM, Flash, hard disks, and/or other components and/or devices that may store at least one bit of data.

The vehicle 100 may further include GNSS sensor(s) 158. The GNSS sensor(s) 158 (e.g., GPS, assisted GPS sensors, differential GPS (DGPS) sensors, etc.), to assist in mapping, perception, occupancy grid generation, and/or path planning functions. Any number of GNSS sensor(s) 158 may be used, including, for example and without limitation, a GPS using a USB connector with an Ethernet to Serial (RS-232) bridge.

The vehicle 100 may further include RADAR sensor(s) 160. The RADAR sensor(s) 160 may be used by the vehicle 100 for long-range vehicle detection, even in darkness and/or severe weather conditions. RADAR functional safety levels may be ASIL B. The RADAR sensor(s) 160 may use the CAN and/or the bus 102 (e.g., to transmit data generated by the RADAR sensor(s) 160) for control and to access object tracking data, with access to Ethernet to access raw data in some examples. A wide variety of RADAR sensor types may be used. For example, and without limitation, the RADAR sensor(s) 160 may be suitable for front, rear, and side RADAR use. In some example, Pulse Doppler RADAR sensor(s) are used.

The RADAR sensor(s) 160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 100 surroundings at higher speeds with minimal interference from traffic in adjacent lanes. The other two antennae may expand the field of view, making it possible to quickly detect vehicles entering or leaving the vehicle's 100 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 100 may further include ultrasonic sensor(s) 162. The ultrasonic sensor(s) 162, which may be positioned at the front, back, and/or the sides of the vehicle 100, may be used for park assist and/or to create and update an occupancy grid. A wide variety of ultrasonic sensor(s) 162 may be used, and different ultrasonic sensor(s) 162 may be used for different ranges of detection (e.g., 2.5 m, 4 m). The ultrasonic sensor(s) 162 may operate at functional safety levels of ASIL B.

The vehicle 100 may include LIDAR sensor(s) 164. The LIDAR sensor(s) 164 may be used for object and pedestrian detection, emergency braking, collision avoidance, and/or other functions. The LIDAR sensor(s) 164 may be functional safety level ASIL B. In some examples, the vehicle 100 may include multiple LIDAR sensors 164 (e.g., two, four, six, etc.) that may use Ethernet (e.g., to provide data to a Gigabit Ethernet switch).

In some examples, the LIDAR sensor(s) 164 may be capable of providing a list of objects and their distances for a 360-degree field of view. Commercially available LIDAR sensor(s) 164 may have an advertised range of approximately 100 m, with an accuracy of 2 cm-3 cm, and with support for a 100 Mbps Ethernet connection, for example. In some examples, one or more non-protruding LIDAR sensors 164 may be used. In such examples, the LIDAR sensor(s) 164 may be implemented as a small device that may be embedded into the front, rear, sides, and/or corners of the vehicle 100. The LIDAR sensor(s) 164, in such examples, may provide up to a 120-degree horizontal and 35-degree vertical field-of-view, with a 200 m range even for low-reflectivity objects. Front-mounted LIDAR sensor(s) 164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 164 may be less susceptible to motion blur, vibration, and/or shock.

The vehicle may further include IMU sensor(s) 166. The IMU sensor(s) 166 may be located at a center of the rear axle of the vehicle 100, in some examples. The IMU sensor(s) 166 may include, for example and without limitation, an accelerometer(s), a magnetometer(s), a gyroscope(s), a magnetic compass(es), and/or other sensor types. In some examples, such as in six-axis applications, the IMU sensor(s) 166 may include accelerometers and gyroscopes, while in nine-axis applications, the IMU sensor(s) 166 may include accelerometers, gyroscopes, and magnetometers.

In some embodiments, the IMU sensor(s) 166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 166 may enable the vehicle 100 to estimate heading without requiring input from a magnetic sensor by directly observing and correlating the changes in velocity from GPS to the IMU sensor(s) 166. In some examples, the IMU sensor(s) 166 and the GNSS sensor(s) 158 may be combined in a single integrated unit.

The vehicle may include microphone(s) 196 placed in and/or around the vehicle 100. The microphone(s) 196 may be used for emergency vehicle detection and identification, among other things.

The vehicle may further include any number of camera types, including stereo camera(s) 168, wide-view camera(s) 170, infrared camera(s) 172, surround camera(s) 174, long-range and/or mid-range camera(s) 198, and/or other camera types. The cameras may be used to capture image data around an entire periphery of the vehicle 100. The types of cameras used depends on the embodiments and requirements for the vehicle 100, and any combination of camera types may be used to provide the necessary coverage around the vehicle 100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 1A and FIG. 1B.

The vehicle 100 may further include vibration sensor(s) 142. The vibration sensor(s) 142 may measure vibrations of components of the vehicle, such as the axle(s). For example, changes in vibrations may indicate a change in road surfaces. In another example, when two or more vibration sensors 142 are used, the differences between the vibrations may be used to determine friction or slippage of the road surface (e.g., when the difference in vibration is between a power-driven axle and a freely rotating axle).

The vehicle 100 may include an ADAS system 138. The ADAS system 138 may include a SoC, in some examples. The ADAS system 138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 160, LIDAR sensor(s) 164, and/or a camera(s). The ACC systems may include longitudinal ACC and/or lateral ACC. Longitudinal ACC monitors and controls the distance to the vehicle immediately ahead of the vehicle 100 and automatically adjust the vehicle speed to maintain a safe distance from vehicles ahead. Lateral ACC performs distance keeping, and advises the vehicle 100 to change lanes when necessary. Lateral ACC is related to other ADAS applications such as LCA and CWS.

CACC uses information from other vehicles that may be received via the network interface 124 and/or the wireless antenna(s) 126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 100), while the I2V communication concept provides information about traffic further ahead. CACC systems may include either or both I2V and V2V information sources. Given the information of the vehicles ahead of the vehicle 100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 100 if the vehicle 100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 100 is backing up. Some RCTW systems include AEB to ensure that the vehicle brakes are applied to avoid a crash. RCTW systems may use one or more rear-facing RADAR sensor(s) 160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 100, the vehicle 100 itself must, in the case of conflicting results, decide whether to heed the result from a primary computer or a secondary computer (e.g., a first controller 136 or a second controller 136). For example, in some embodiments, the ADAS system 138 may be a backup and/or secondary computer for providing perception information to a backup computer rationality module. The backup computer rationality monitor may run a redundant diverse software on hardware components to detect faults in perception and dynamic driving tasks. Outputs from the ADAS system 138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 104.

In other examples, ADAS system 138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 138 may be fed into the primary computer's perception block and/or the primary computer's dynamic driving task block. For example, if the ADAS system 138 indicates a forward crash warning due to an object immediately ahead, the perception block may use this information when identifying objects. In other examples, the secondary computer may have its own neural network which is trained and thus reduces the risk of false positives, as described herein.

The vehicle 100 may further include the infotainment SoC 130 (e.g., an in-vehicle infotainment system (IVI)). Although illustrated and described as a SoC, the infotainment system may not be a SoC, and may include two or more discrete components. The infotainment SoC 130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 100. For example, the infotainment SoC 130 may radios, disk players, navigation systems, video players, USB and Bluetooth connectivity, carputers, in-car entertainment, Wi-Fi, steering wheel audio controls, hands free voice control, a heads-up display (HUD), an HMI display 134, a telematics device, a control panel (e.g., for controlling and/or interacting with various components, features, and/or systems), and/or other components. The infotainment SoC 130 may further be used to provide information (e.g., visual and/or audible) to a user(s) of the vehicle, such as information from the ADAS system 138, autonomous driving information such as planned vehicle maneuvers, trajectories, surrounding environment information (e.g., intersection information, vehicle information, road information, etc.), and/or other information.

The infotainment SoC 130 may include GPU functionality. The infotainment SoC 130 may communicate over the bus 102 (e.g., CAN bus, Ethernet, etc.) with other devices, systems, and/or components of the vehicle 100. In some examples, the infotainment SoC 130 may be coupled to a supervisory MCU such that the GPU of the infotainment system may perform some self-driving functions in the event that the primary controller(s) 136 (e.g., the primary and/or backup computers of the vehicle 100) fail. In such an example, the infotainment SoC 130 may put the vehicle 100 into a chauffeur to safe stop mode, as described herein.

The vehicle 100 may further include an instrument cluster 132 (e.g., a digital dash, an electronic instrument cluster, a digital instrument panel, etc.). The instrument cluster 132 may include a controller and/or supercomputer (e.g., a discrete controller or supercomputer). The instrument cluster 132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 130 and the instrument cluster 132. In other words, the instrument cluster 132 may be included as part of the infotainment SoC 130, or vice versa.

Figure 1D:
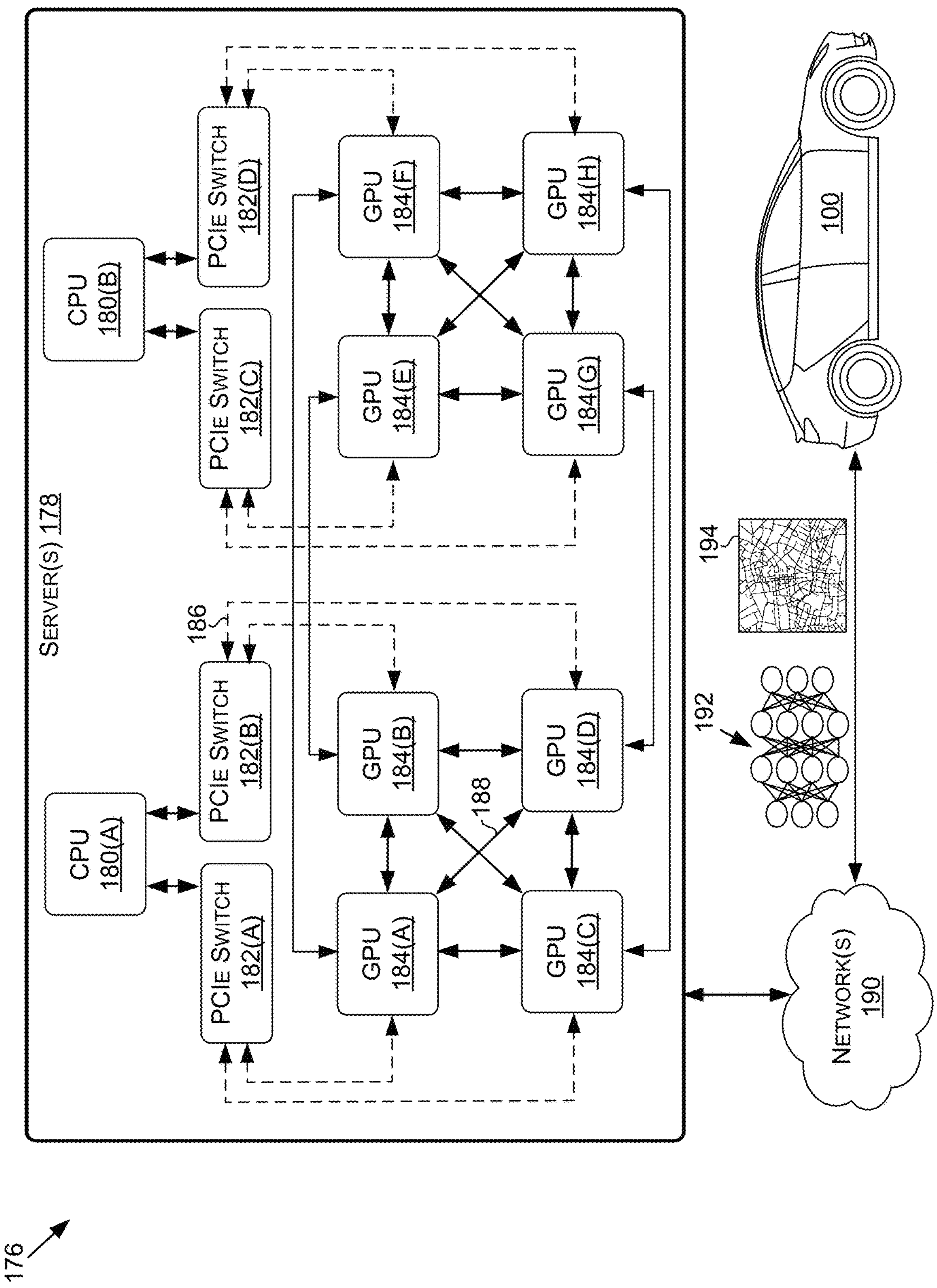
FIG. 1D is a system diagram for communication between cloud-based server(s) and the example autonomous vehicle of FIG. 1A, in accordance with at least some embodiments of the present disclosure.

FIG. 1D is a system diagram for communication between cloud-based server(s) and the example autonomous vehicle 100 of FIG. 1A, in accordance with some embodiments of the present disclosure. The system 176 may include server(s) 178, network(s) 190, and vehicles, including the vehicle 100. The server(s) 178 may include a plurality of GPUs 184(A)-184(H) (collectively referred to herein as GPUs 184), PCIe switches 182(A)-182(H) (collectively referred to herein as PCIe switches 182), and/or CPUs 180(A)-180(B) (collectively referred to herein as CPUs 180). The GPUs 184, the CPUs 180, and the PCIe switches may be interconnected with high-speed interconnects such as, for example and without limitation, NVLink interfaces 188 developed by NVIDIA and/or PCIe connections 186. In some examples, the GPUs 184 are connected via NVLink and/or NVSwitch SoC and the GPUs 184 and the PCIe switches 182 are connected via PCIe interconnects. Although eight GPUs 184, two CPUs 180, and two PCIe switches are illustrated, this is not intended to be limiting. Depending on the embodiment, each of the server(s) 178 may include any number of GPUs 184, CPUs 180, and/or PCIe switches. For example, the server(s) 178 may each include eight, sixteen, thirty-two, and/or more GPUs 184.

The server(s) 178 may receive, over the network(s) 190 and from the vehicles, image data representative of images showing unexpected or changed road conditions, such as recently commenced road-work. The server(s) 178 may transmit, over the network(s) 190 and to the vehicles, neural networks 192, updated neural networks 192, and/or map information 194, including information regarding traffic and road conditions. The updates to the map information 194 may include updates for the HD map 122, such as information regarding construction sites, potholes, detours, flooding, and/or other obstructions. In some examples, the neural networks 192, the updated neural networks 192, and/or the map information 194 may have resulted from new training and/or experiences represented in data received from any number of vehicles in the environment, and/or based on training performed at a datacenter (e.g., using the server(s) 178 and/or other servers).

The server(s) 178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 190, and/or the machine learning models may be used by the server(s) 178 to remotely monitor the vehicles.

In some examples, the server(s) 178 may receive data from the vehicles and apply the data to up-to-date real-time neural networks for real-time intelligent inferencing. The server(s) 178 may include deep-learning supercomputers and/or dedicated AI computers powered by GPU(s) 184, such as a DGX and DGX Station machines developed by NVIDIA. However, in some examples, the server(s) 178 may include deep learning infrastructure that use only CPU-powered datacenters.

The deep-learning infrastructure of the server(s) 178 may be capable of fast, real-time inferencing, and may use that capability to evaluate and verify the health of the processors, software, and/or associated hardware in the vehicle 100. For example, the deep-learning infrastructure may receive periodic updates from the vehicle 100, such as a sequence of images and/or objects that the vehicle 100 has located in that sequence of images (e.g., via computer vision and/or other machine learning object classification techniques). The deep-learning infrastructure may run its own neural network to identify the objects and compare them with the objects identified by the vehicle 100 and, if the results do not match and the infrastructure concludes that the AI in the vehicle 100 is malfunctioning, the server(s) 178 may transmit a signal to the vehicle 100 instructing a fail-safe computer of the vehicle 100 to assume control, notify the passengers, and complete a safe parking maneuver.

For inferencing, the server(s) 178 may include the GPU(s) 184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 2:
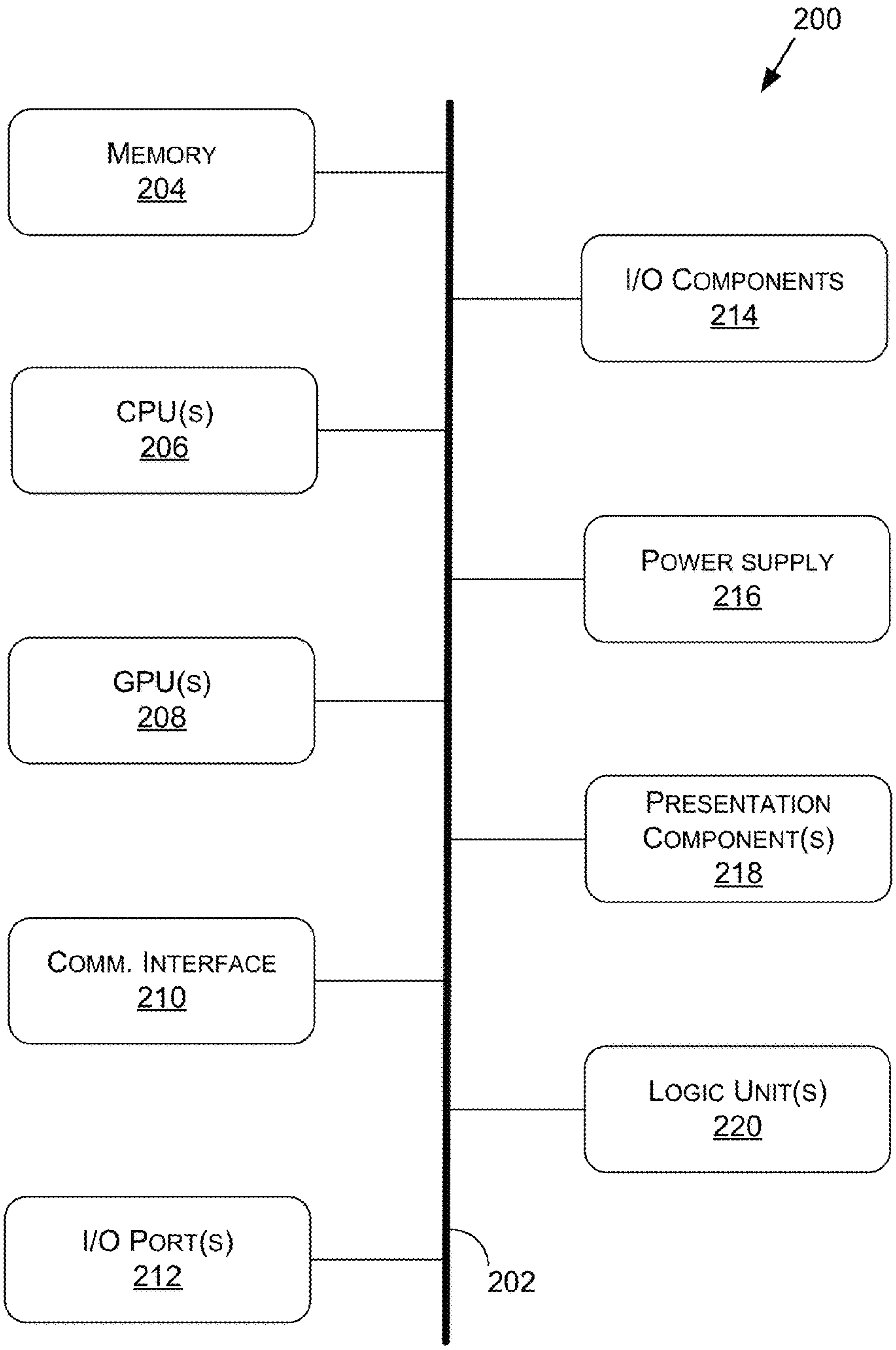
FIG. 2 is a block diagram of an example computing device suitable for use in implementing at least some embodiments of the present disclosure.

FIG. 2 is a block diagram of an example computing device(s) 200 suitable for use in implementing some embodiments of the present disclosure. Computing device 200 may include an interconnect system 202 that directly or indirectly couples the following devices: memory 204, one or more central processing units (CPUs) 206, one or more graphics processing units (GPUs) 208, a communication interface 210, input/output (I/O) ports 212, input/output components 214, a power supply 216, one or more presentation components 218 (e.g., display(s)), and one or more logic units 220. In at least one embodiment, the computing device(s) 200 may comprise one or more virtual machines (VMs), and/or any of the components thereof may comprise virtual components (e.g., virtual hardware components). For non-limiting examples, one or more of the GPUs 208 may comprise one or more vGPUs, one or more of the CPUs 206 may comprise one or more vCPUs, and/or one or more of the logic units 220 may comprise one or more virtual logic units. As such, a computing device(s) 200 may include discrete components (e.g., a full GPU dedicated to the computing device 200), virtual components (e.g., a portion of a GPU dedicated to the computing device 200), or a combination thereof.

Although the various blocks of FIG. 2 are shown as connected via the interconnect system 202 with lines, this is not intended to be limiting and is for clarity only. For example, in some embodiments, a presentation component 218, such as a display device, may be considered an I/O component 214 (e.g., if the display is a touch screen). As another example, the CPUs 206 and/or GPUs 208 may include memory (e.g., the memory 204 may be representative of a storage device in addition to the memory of the GPUs 208, the CPUs 206, and/or other components). In other words, the computing device of FIG. 2 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 2.

The interconnect system 202 may represent one or more links or busses, such as an address bus, a data bus, a control bus, or a combination thereof. The interconnect system 202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 206 may be directly connected to the memory 204. Further, the CPU 206 may be directly connected to the GPU 208. Where there is direct, or point-to-point connection between components, the interconnect system 202 may include a PCIe link to carry out the connection. In these examples, a PCI bus need not be included in the computing device 200.

The memory 204 may include any of a variety of computer-readable media. The computer-readable media may be any available media that may be accessed by the computing device 200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 206 may be configured to execute at least some of the computer-readable instructions to control one or more components of the computing device 200 to perform one or more of the methods and/or processes described herein. The CPU(s) 206 may each include one or more cores (e.g., one, two, four, eight, twenty-eight, seventy-two, etc.) that are capable of handling a multitude of software threads simultaneously. The CPU(s) 206 may include any type of processor, and may include different types of processors depending on the type of computing device 200 implemented (e.g., processors with fewer cores for mobile devices and processors with more cores for servers). For example, depending on the type of computing device 200, the processor may be an Advanced RISC Machines (ARM) processor implemented using Reduced Instruction Set Computing (RISC) or an x86 processor implemented using Complex Instruction Set Computing (CISC). The computing device 200 may include one or more CPUs 206 in addition to one or more microprocessors or supplementary co-processors, such as math co-processors.

In addition to or alternatively from the CPU(s) 206, the GPU(s) 208 may be configured to execute at least some of the computer-readable instructions to control one or more components of the computing device 200 to perform one or more of the methods and/or processes described herein. One or more of the GPU(s) 208 may be an integrated GPU (e.g., with one or more of the CPU(s) 206 and/or one or more of the GPU(s) 208 may be a discrete GPU. In embodiments, one or more of the GPU(s) 208 may be a coprocessor of one or more of the CPU(s) 206. The GPU(s) 208 may be used by the computing device 200 to render graphics (e.g., 3D graphics) or perform general purpose computations. For example, the GPU(s) 208 may be used for General-Purpose computing on GPUs (GPGPU). The GPU(s) 208 may include hundreds or thousands of cores that are capable of handling hundreds or thousands of software threads simultaneously. The GPU(s) 208 may generate pixel data for output images in response to rendering commands (e.g., rendering commands from the CPU(s) 206 received via a host interface). The GPU(s) 208 may include graphics memory, such as display memory, for storing pixel data or any other suitable data, such as GPGPU data. The display memory may be included as part of the memory 204. The GPU(s) 208 may include two or more GPUs operating in parallel (e.g., via a link). The link may directly connect the GPUs (e.g., using NVLINK) or may connect the GPUs through a switch (e.g., using NVSwitch). When combined together, each GPU 208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 206 and/or the GPU(s) 208, the logic unit(s) 220 may be configured to execute at least some of the computer-readable instructions to control one or more components of the computing device 200 to perform one or more of the methods and/or processes described herein. In embodiments, the CPU(s) 206, the GPU(s) 208, and/or the logic unit(s) 220 may discretely or jointly perform any combination of the methods, processes and/or portions thereof. One or more of the logic units 220 may be part of and/or integrated in one or more of the CPU(s) 206 and/or the GPU(s) 208 and/or one or more of the logic units 220 may be discrete components or otherwise external to the CPU(s) 206 and/or the GPU(s) 208. In embodiments, one or more of the logic units 220 may be a coprocessor of one or more of the CPU(s) 206 and/or one or more of the GPU(s) 208.

Examples of the logic unit(s) 220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 210 may include one or more receivers, transmitters, and/or transceivers that enable the computing device 200 to communicate with other computing devices via an electronic communication network, included wired and/or wireless communications. The communication interface 210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 220 and/or communication interface 210 may include one or more data processing units (DPUs) to transmit data received over a network and/or through interconnect system 202 directly to (e.g., a memory of) one or more GPU(s) 208.

The I/O ports 212 may enable the computing device 200 to be logically coupled to other devices including the I/O components 214, the presentation component(s) 218, and/or other components, some of which may be built in to (e.g., integrated in) the computing device 200. Illustrative I/O components 214 include a microphone, mouse, keyboard, joystick, game pad, game controller, satellite dish, scanner, printer, wireless device, etc. The I/O components 214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 200. The computing device 200 may be include depth cameras, such as stereoscopic camera systems, infrared camera systems, RGB camera systems, touchscreen technology, and combinations of these, for gesture detection and recognition. Additionally, the computing device 200 may include accelerometers or gyroscopes (e.g., as part of an inertia measurement unit (IMU)) that enable detection of motion. In some examples, the output of the accelerometers or gyroscopes may be used by the computing device 200 to render immersive augmented reality or virtual reality.

The power supply 216 may include a hard-wired power supply, a battery power supply, or a combination thereof.

The power supply 216 may provide power to the computing device 200 to enable the components of the computing device 200 to operate.

The presentation component(s) 218 may include a display (e.g., a monitor, a touch screen, a television screen, a heads-up-display (HUD), other display types, or a combination thereof), speakers, and/or other presentation components. The presentation component(s) 218 may receive data from other components (e.g., the GPU(s) 208, the CPU(s) 206, DPUs, etc.), and output the data (e.g., as an image, video, sound, etc.).

Example Data Center

Figure 3:
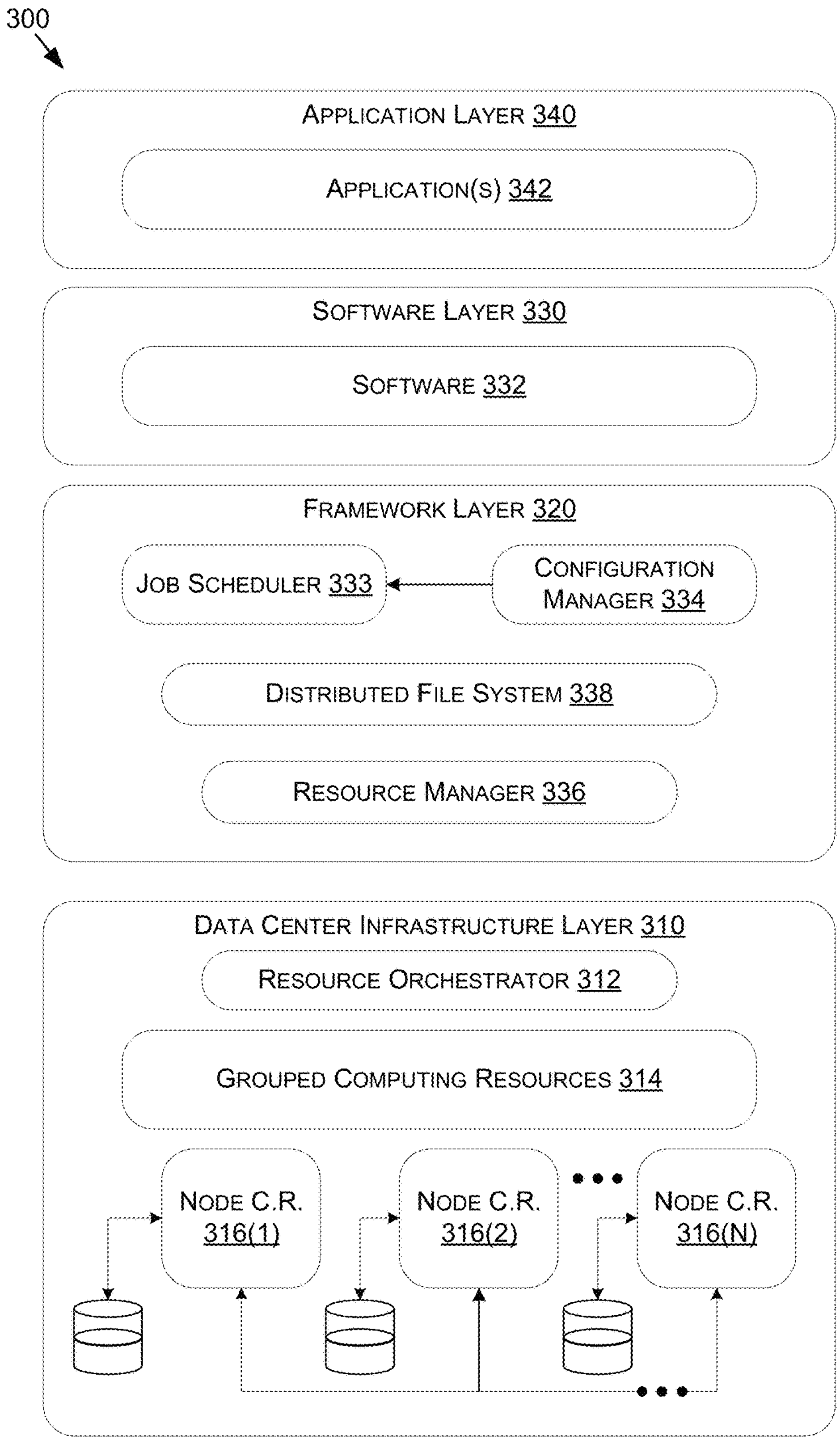
FIG. 3 is a block diagram of an example data center suitable for use in implementing at least some embodiments of the present disclosure.

FIG. 3 illustrates an example data center 300 that may be used in at least one embodiments of the present disclosure. The data center 300 may include a data center infrastructure layer 310, a framework layer 320, a software layer 330, and/or an application layer 340.

As shown in FIG. 3, the data center infrastructure layer 310 may include a resource orchestrator 312, grouped computing resources 314, and node computing resources ("node C.R.s") 316(1)-316(N), where "N" represents any whole, positive integer. In at least one embodiment, node C.R.s 316(1)-316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 316(1)-316(N) may correspond to a server having one or more of the above-mentioned computing resources. In addition, in some embodiments, the node C.R.s 316(1)-3161(N) may include one or more virtual components, such as vGPUs, vCPUs, and/or the like, and/or one or more of the node C.R.s 316(1)-316(N) may correspond to a virtual machine (VM).

In at least one embodiment, grouped computing resources 314 may include separate groupings of node C.R.s 316 housed within one or more racks (not shown), or many racks housed in data centers at various geographical locations (also not shown). Separate groupings of node C.R.s 316 within grouped computing resources 314 may include grouped compute, network, memory or storage resources that may be configured or allocated to support one or more workloads. In at least one embodiment, several node C.R.s 316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 312 may configure or otherwise control one or more node C.R.s 316(1)-316(N) and/or grouped computing resources 314. In at least one embodiment, resource orchestrator 312 may include a software design infrastructure (SDI) management entity for the data center 300. The resource orchestrator 312 may include hardware, software, or some combination thereof.

In at least one embodiment, as shown in FIG. 3, framework layer 320 may include a job scheduler 333, a configuration manager 334, a resource manager 336, and/or a distributed file system 338. The framework layer 320 may include a framework to support software 332 of software layer 330 and/or one or more application(s) 342 of application layer 340. The software 332 or application(s) 342 may respectively include web-based service software or applications, such as those provided by Amazon Web Services, Google Cloud and Microsoft Azure. The framework layer 320 may be, but is not limited to, a type of free and open-source software web application framework such as Apache Spark™ (hereinafter "Spark") that may utilize distributed file system 338 for large-scale data processing (e.g., "big data"). In at least one embodiment, job scheduler 333 may include a Spark driver to facilitate scheduling of workloads supported by various layers of data center 300. The configuration manager 334 may be capable of configuring different layers such as software layer 330 and framework layer 320 including Spark and distributed file system 338 for supporting large-scale data processing. The resource manager 336 may be capable of managing clustered or grouped computing resources mapped to or allocated for support of distributed file system 338 and job scheduler 333. In at least one embodiment, clustered or grouped computing resources may include grouped computing resource 314 at data center infrastructure layer 310. The resource manager 336 may coordinate with resource orchestrator 312 to manage these mapped or allocated computing resources.

In at least one embodiment, software 332 included in software layer 330 may include software used by at least portions of node C.R.s 316(1)-316(N), grouped computing resources 314, and/or distributed file system 338 of framework layer 320. One or more types of software may include, but are not limited to, Internet web page search software, e-mail virus scan software, database software, and streaming video content software.

In at least one embodiment, application(s) 342 included in application layer 340 may include one or more types of applications used by at least portions of node C.R.s 316(1)-316 (N), grouped computing resources 314, and/or distributed file system 338 of framework layer 320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 334, resource manager 336, and resource orchestrator 312 may implement any number and type of self-modifying actions based on any amount and type of data acquired in any technically feasible fashion. Self-modifying actions may relieve a data center operator of data center 300 from making possibly bad configuration decisions and possibly avoiding underutilized and/or poor performing portions of a data center.

The data center 300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 300. In at least one embodiment, trained or deployed machine learning models corresponding to one or more neural networks may be used to infer or predict information using resources described above with respect to the data center 300 by using weight parameters calculated through one or more training techniques, such as but not limited to those described herein.

In at least one embodiment, the data center 300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 200 of FIG. 2—e.g., each device may include similar components, features, and/or functionality of the computing device(s) 200. In addition, where backend devices (e.g., servers, NAS, etc.) are implemented, the backend devices may be included as part of a data center 300, an example of which is described in more detail herein with respect to FIG. 3.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client—server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 200 described herein with respect to FIG. 2. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Figure 4:
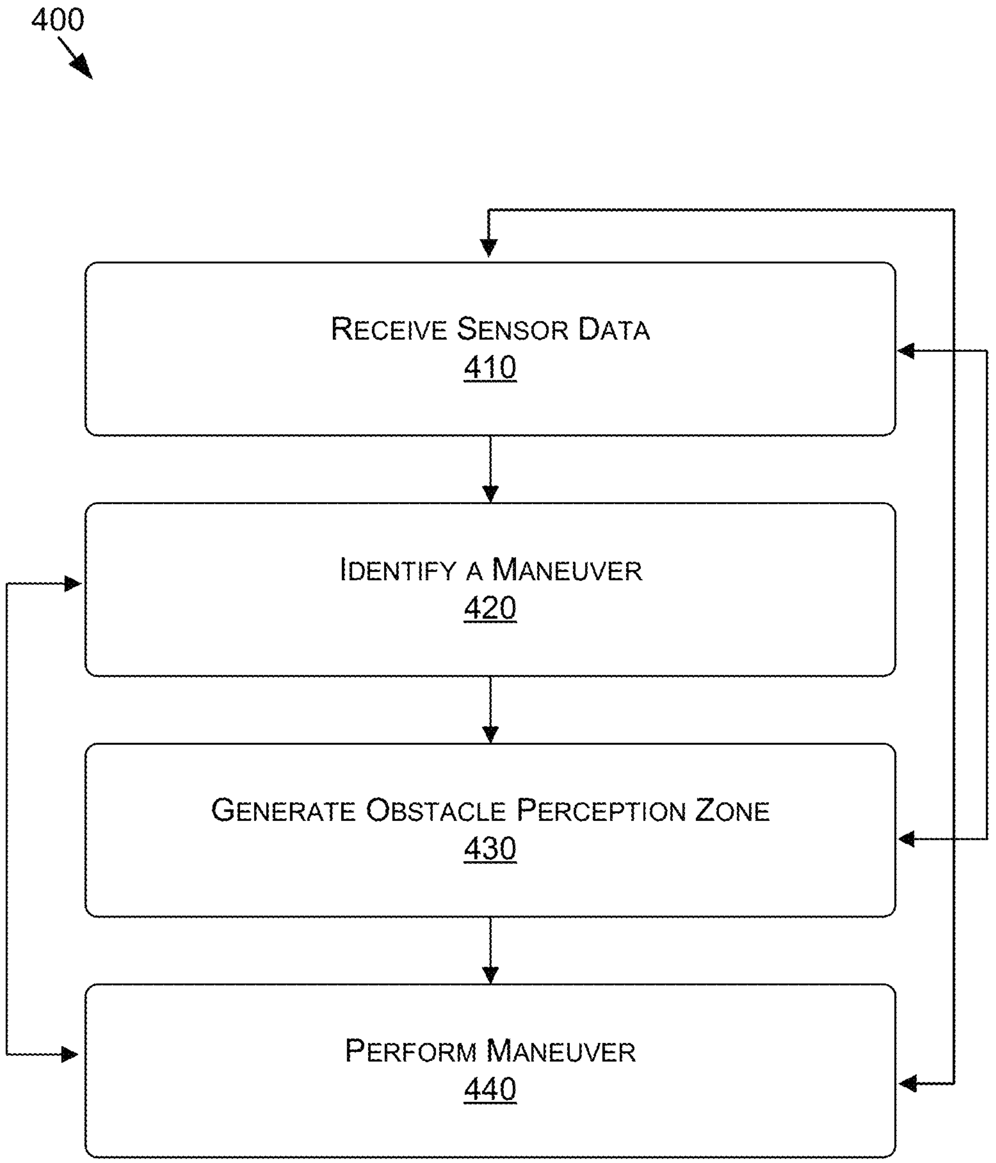
FIG. 4 is a flow diagram of an example process for generating safety zones for implementing at least some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The disclosed methods may be implemented with respect to the autonomous vehicle system of FIG. 1. However, these methods may additionally or alternatively be executed by any one system, or any combination of systems, including, but not limited to, those described herein.

FIG. 4 is a flow diagram depicting a method 400 for constructing safety zones, in accordance with some embodiments of the present disclosure. Method 400 may be implemented by one or more systems, devices, or components discussed above. At block 410, method 400 includes receiving sensor data corresponding to objects perceivable by a robotic system. The sensor data may be based on, though is not limited to, readings from the sorts of sensors discussed above. The sensors allow the robotic system to perceive its surroundings and obtain information on its environment. Sensor data may be, or may include, measurements or readings by sensors, as well as derivations of sensor data (e.g., results of analyses, transformations, or conversions of sensor data).

The sensor data, or derivations thereof, provide information that can be used by the robotic system to make decisions about one or more operations to be performed by the robotic system, such as maneuvers to be performed (e.g., changes in position or orientation, interactions with objects in the surroundings of the robotic system, etc.) to be performed by the robotic system. The sensors may allow the robotic system to "perceive" its environment beyond safety-critical zones (e.g., beyond regions potentially including objects posing a safety risk to the robotic system), and accordingly, the robotic system may prioritize which data to consider in avoiding hazards (e.g., collisions).

The method 400, at block 420, may include identifying a maneuver. It is noted that, if a maneuver is already identified or otherwise known (e.g., the maneuver might have been based on, or obtained during, a step performed before or concurrent with step 410), the method 400 may skip over block 420 to block 430. The maneuver may be based on the sensor data (e.g., changing course to avoid a potential collision with an object identified using the sensor data) or be independent of the sensor data (e.g., a maneuver to perform one or more operations for which the robotic system is tasked). The maneuver may also be identified based on user input, such as a user selecting or otherwise identifying an operation or task to be performed by the robotic system.

At block 430, method 400 includes generating an obstacle perception zone. The obstacle perception zone may be generated by a separate module or by the same module that performed another step in method 400 (e.g., the module that identified the maneuver). The obstacle perception zone may be constructed based at least in part on a maneuver, such as an intended maneuver of the robotic system. The obstacle perception zone can correspond to regions of space in which it is possible for the robotic system to collide with an object in its surroundings. Similarly, in example embodiments, the obstacle perception zone can correspond to regions of space in which a likelihood of the robotic system colliding with another object is above a threshold, such as greater than 0.1%, 0.25%, 0.5%, 0.75%, 1%, 1.5%, 2%, 3%, 4%, 5%, 6%, 7%, 8%, 9%, 10%, 12%, or 15%. The potential of colliding with another object may be determined, for example, based on predictions about the actions (e.g., changes in position or changes in velocity) of objects. The predictions can take into account one or more maneuvers, such as an intended maneuver. The predictions can also be based on one or more potential alternative maneuvers if, for example, a goal of an intended maneuver (e.g., reaching an off-ramp on a highway) can be accomplished in different ways.

The obstacle perception zone can serve to focus the robotic system on the most relevant data at a particular moment and filter out other data, reducing requirements for computational resources. One way in which this can be accomplished is by shrinking the "volume" of the physical space that is considered for potential safety threats to the robotic system. The smaller the volume, the fewer the number of objects that are in (e.g., that "fit" in) the volume and are to be taken into account (e.g., other objects outside of the zone do not need to be tracked or have predictions generated about future states).

As further discussed below, constructing the obstacle perception zone can comprise a convolution or other operation that that models dependencies between goals. In potential implementations, the operation can be a temporal convolution operation. The temporal convolution operation can model temporal dependencies between goals. The temporal dependencies can correspond to potential collisions during an intended maneuver. The obstacle perception zone may be generated to account for a collision at any point in time until the maneuver is completed.

The obstacle perception zone can be based at least on, or otherwise constrained by, a maneuver. In potential implementations, generating the obstacle perception zone can comprise performing Hamilton-Jacobi (HJ) reachability formulation. The HJ formulation can be constrained by the maneuver. The operation can employ a Hamilton-Jacobi-Bellman (HJB) equation. Generating the obstacle perception zone based at least on the maneuver can comprise filtering out regions of space not relevant to a route of the robotic system.

In various embodiments, an obstacle perception zone can be re-constructed as needed. For example, if an intended maneuver changes, the obstacle perception zone can be recomputed. This may be deemed appropriate if certain maneuvers under certain conditions are deemed more or less risky. For example, a maneuver at highway speeds may require a larger obstacle perception zone because a larger region of space becomes relevant when traveling faster. Similarly, a right turn at a stop sign may warrant a smaller obstacle perception zone because potential collisions are more likely to occur closer to a vehicle under those circumstances. It is noted that having a smaller obstacle perception zone does not necessarily reduce the number of potential collisions to be considered because, for example, a busy intersection with cars, pedestrians, bicyclists, and animals can include a larger density of potential hazards than a larger obstacle perception zone on a highway with few or no other cars around.

At block 440, method 400 includes performing a maneuver. The maneuver can be an intended maneuver. Alternatively, the maneuver that is performed can be a different maneuver if, for example, the intended maneuver is deemed to be too likely to result in a collision. Because sensor data is continuing to be collected and circumstances can change unexpectedly and quickly, a maneuver would not necessarily be performed until completion. For example, if a previously-undetected object (e.g., motorcycle) is heading towards the robotic system during a maneuver, the robotic system can deviate from the maneuver to maintain safety. Conversely, if during a maneuver an object previously deemed a hazard changes course and is no longer deemed to pose a risk of a potential collision, and the maneuver being performed was protracted so as to avoid a potential collision, the maneuver can be adjusted to engage in a more direct (or otherwise less protracted) path without sacrificing safety.

It is noted that in method 400, alternative paths include step 420 followed by step 440 and back again, step 410 followed by step 430 and back again, and step 410 followed by step 440 and back again.

Autonomous or Semi-Autonomous Vehicle Examples

Complexity of Autonomy: The complexity of vehicle autonomy defies the existence of universally applicable performance metrics and objectives, as well as any simple descriptions of the multitudinous constraints that must be satisfied during operation. Despite these challenges, the need to quantify confidence in such systems as a prerequisite for their safe deployment has motivated decompositional approaches whereby various subsystems of the autonomy stack are separately validated (e.g., towards synthesizing a safety argument for the combined system). Subdividing validation and verification (V&V) problems into component-wise performance requirements improves the tractability of both certifying and building safe systems. The disclosed approach considers additional data-dependent decomposition of V&V, further aiding tractability by defining performance requirements on a scenario-specific basis.

One component where evaluation is seemingly straightforward is object detection which, when regarded in isolation, enjoys a plethora of established metrics from the computer vision community capturing performance on a given dataset. The choice of what this validation data should be, however, invokes "full-stack" considerations of which obstacles (e.g., other vehicles, pedestrians, bicyclists) in a scene have the potential to be safety-critical, taking into account downstream behavior prediction, planning, and control components. That is, while an aspirational goal is to demand high detection performance for all obstacles in a large radius around an autonomous vehicle (AV), in practice perception system performance are optimized for a more restricted, task-specific perception zone.

Completeness and Soundness: Completeness and soundness are both desirable properties of perception zones. Informally, a zone is complete if all safety-critical objects in a scene are captured within; a zone is sound if all objects within the extent of the zone indeed have the potential to be safety-critical. Of these two, completeness may be non-negotiable: it may be necessary that a perception system raise all obstacles relevant to AV safety for downstream consideration and computation. Soundness requirements are therefore typically relaxed, for example, as in, with the interpretation of adding a conservative expectation for detecting further objects beyond the zones' necessary completeness. However, recognizing that the intent of defining perception zones is to make the development of valid object detectors more tractable, improving the soundness of zone constructions is sought.

Embodiments of the disclosed approach apply conditions related to the specific driving scenario (e.g., computing perception metrics specific to an operational design domain (ODD)) to improve soundness without sacrificing completeness. Knowledge of interaction dynamics, representing downstream behavior planning subsystems, can be used to restrict the designation of obstacles as safety-critical within interaction-dynamics-aware perception zones, or safety zones for short. The additional context of the AV's intended driving maneuver is also leveraged to further reduce safety zone size and improve V&V tractability. The disclosed approach may computationally employ Hamilton-Jacobi (HJ) reachability analysis to more completely account for the closed-loop interaction dynamics between the AV and obstacle agents, with additional constraints specifying AV maneuver completion. Accounting for such constraints is a technical challenge addressed by the disclosed approach. Rather than considering only the AV/obstacle interaction up until potential collision within a time horizon, embodiments of the disclosed approach can refine maneuver-aware perception zones by requiring this potential collision to occur intermediately along one of the ways the AV planner may choose to accomplish the maneuver.

Thus, embodiments of the disclosed approach can refine interaction-dynamics-aware perception zones by equipping HJ-reachability formulations with AV maneuver constraints, thus producing tighter maneuver-conditioned zones without introducing safety blind spots. Such maneuver-aware perception zones may be computed via a "temporal convolution" operation which enables modeling of temporal dependencies between state goals (e.g., potential collision before maneuver completion).

Figure 5:
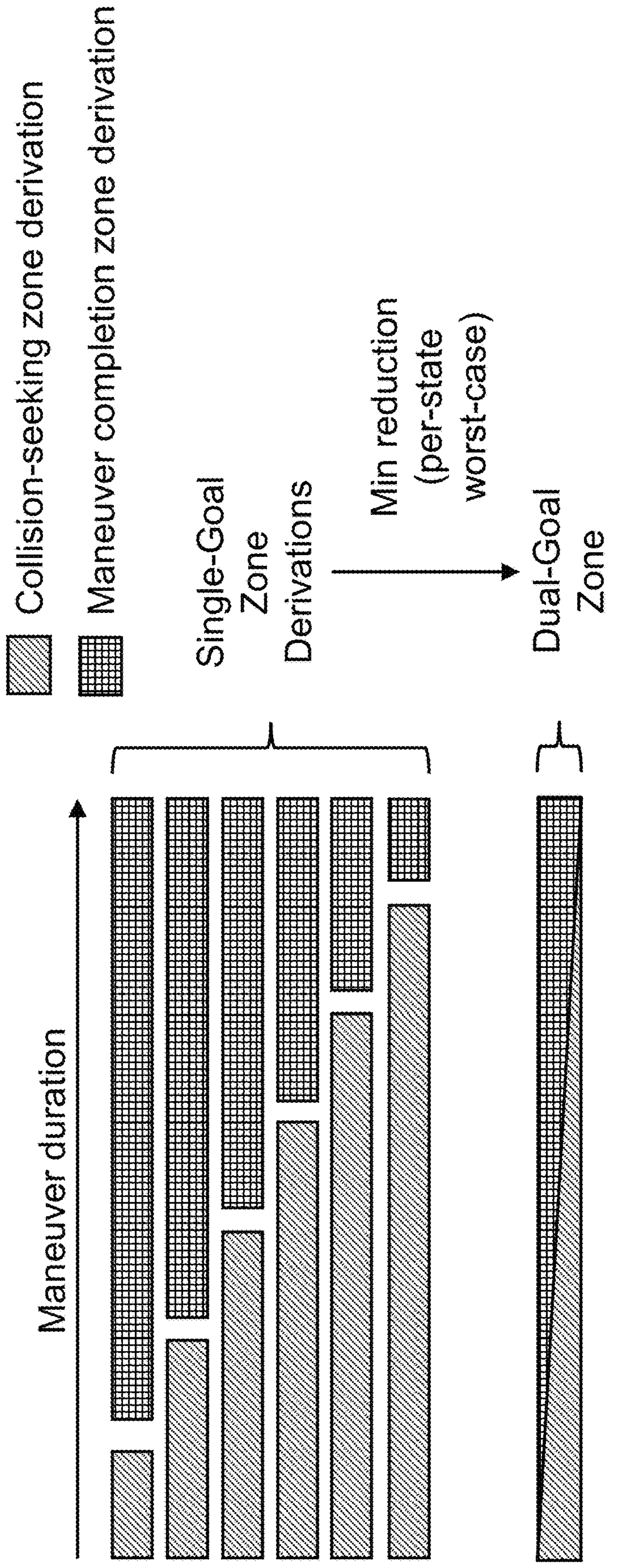
FIG. 5 depicts an example temporal convolution approach to calculating safety zones according at least some embodiments of the present disclosure.

FIG. 5 illustrates an example of a temporal convolution approach that can be used to calculate zones with two temporally-related goals. Here, the disclosed approach can be used, in various embodiments, to represent all possible permutations of a temporally-related dual-goal reachability derivation. In various embodiments, perception safety zones computed as disclosed may be used in a "drop-in" fashion, sub-selecting objects to consider for AV perception metrics computation, in order to direct development effort towards the most impactful increases in AV performance, safety, and trust.

Control Theory and the Hamilton-Jacobi-Bellman (HJB) Formulation in Computation of Perception Safety Zones: Since a perception zone describes regions where it is possible for two vehicles to collide (under assumptions about their behaviors), it can be checked whether a collision is possible by solving an optimal control problem. An optimal control problem deals with the problem of finding a control law u(•) for a given system that minimizes a cost functional subject to state, control, and dynamics constraints. Let the dynamics of a system be $\dot{x}=f(x, u, t)$ where $x \in \mathbb{R}^n$ is the state, and $u \in U \subset \mathbb{R}^m$ is the control input. For a single agent case, x and u denotes the agent's state and controls respectively, and f the agent's dynamics. In the case of two agents interacting with each other, x would denote the joint (or relative) state between the two agents, u would describe the joint controls, and f would denote the joint (or relative) dynamics.

As an example, consider a cost function $$J(x(\cdot), u(\cdot), t_0, t_f) = D(x(t_f)) + \int_{t_0}^{t_f} C(x(t), u(t), t)dt \text{ where } D\colon \mathbb{R}^n \to \mathbb{R}$$

is the terminal cost (e.g., distance to final goal) and $C\colon \mathbb{R}^n \times \mathbb{R}^m \times \mathbb{R} \to R$ is the running cost (e.g., control effort) over the time horizon $[t_0, t_f]$. For the current time to, let the current state of the system be $x(t_0)=x_0$. Then the optimal control law u(•) that minimizes the cost function J over a time horizon $[t_0, t_f]$ is the solution to the following optimization problem, $$\begin{aligned} \min_u \quad & D(x(t_f)) + \int_{t_0}^{t_f} C(x(t), u(t), t)dt \\ \text{s.t.} \quad & \dot{x} = f(x, u, t) \\ & \dot{x}(t_0) = x_0 \\ & u(t) \in \mathcal{U} \end{aligned} \tag{1}$$

To solve for the optimal control law u*(•) from (1) for all initial states, it can be shown that it is equivalent to solving the HJB partial differential equation (PDE), $$\frac{\partial V(x, t)}{\partial t} + \min_{u \in \mathcal{U}} \{\nabla_x V(x, t)^T f(x, u, t) + C(x, u, t)\} = 0 \tag{2}$$

where $V(x, t_f)=D(x)$. The solution to the HJB PDE V(x,t) is known as the Bellman value function which represents the cost incurred from starting at state x at time t and controlling the system optimally (i.e., with $$u^*(x) = \min_u \left\{ \frac{\partial V(x, t)^T}{\partial x} f(x, u, t) + C(x, u, t) \right\}\bigg)$$

until time $t_f$. That is, $V(x,t)=J(x(\bullet), u^*(\bullet), t, t_f)$. There are three things to note:

With respect to running cost, if zero running cost is assumed, i.e., $C(x, u, t)=0\ \forall x, u, t$, and D describes the signed distance from a goal region C (i.e., $C=\{x|D(x)\leq 0\}$), then the optimal control problem can be interpreted as a reachability problem. The value function $V(x,t)=D(x(t_f))$ can then be the terminal cost of the final state if the system currently at state x were to follow the optimal control law $u^*(\cdot)$ until $t_f$. Then $V(x, t)<0$ indicates that is it possible for the system to be inside the target set at time $t_f$. Zero running cost may be treated as an assumption in the discussion.

With respect to a two agent system, agents E and C, let x denote their joint state, $u=[u_E, u_C]\in U^E\times U^C$ their joint control, and f the joint dynamics. Then (2) (with zero running cost) can be rewritten to account for the fact that there are two control input variables to optimize over, $$\frac{\partial V(x,t)}{\partial t}+\min_{u_E\in\mathcal{U}^E}\min_{u_C\in\mathcal{U}^C}\{\nabla_x V(x,t)^T f(x,u_E,u_C,t)\}=0. \tag{3}$$

With respect to reaching target set at any time, the formulation thus far is concerned with reaching the target set C at exactly $t_f$. However, sometimes it is also important to consider whether the system enters the target set any time between $[t_0, t_f]$. To compute the corresponding value function describing entry into the start set at any $t\in[t_0, t_f]$, a slight variation of (2) (with zero running cost) can be solved, $$\frac{\partial V(x,t)}{\partial t}+\min\left\{0,\ \min_{u\in\mathcal{U}}\{\nabla_x V(x,t)^T f(x,u,t)\}\right\}=0. \tag{4}$$

The corresponding two agent setup can analogously be formulated for this case as well. Each of these variations of the HJB equation can be used to construct maneuver-based perception safety zones described below.

Regarding notation, the autonomous vehicle may be referred to as "the ego" vehicle, and variables corresponding to the ego vehicle will have a subscript E. Similarly, for the (uncontrolled) vehicle that the ego vehicle has detected and wants to check if it is in its perception safety zone, this uncontrolled vehicle will be referred to as "the contender". Variables corresponding to the contender vehicle will be denoted by a subscript C. States without any subscripts are assumed to denote the joint state describing both the ego and contender agents.

Maneuver-Based Perception Safety Zones: This section introduces and motivates the notion of decomposing perception safety zones based on the maneuver type, and then describes an example mathematical formulation to construct such a maneuver-based perception safety zone.

One way to calculate safety zones is with HJ reachability using a "min-min" formulation where both the ego vehicle and the contender seek collision. This setup can be used to account for the worst-case ego-contender interaction dynamics so the zone can be argued as complete. However, conservative modeling constraints could make zone geometries excessively large as longer time horizons are considered. While it may be warranted to assume that the contender can perform any dynamically feasible maneuvers for the sake of conservatism, the ego vehicle's next high-level maneuver is typically known within its autonomy stack (e.g., lane change, a right turn, etc.). The disclosed approach leverages this information and constrains the obstacle perception zone derivation in order to improve its soundness while retaining completeness.

To help illustrate the idea behind a maneuver-based perception safety zone, two examples will be discussed. In Example 1, the ego vehicle's next maneuver is a lane change, which is characterized as the following constraint $C_E=\{y_E\in[y_{des}-\overline{\delta y},\ y_{des}+\overline{\delta y}]\}$. It specifies that the lateral position of the ego vehicle is within $\overline{\delta y}$ meters from the lane center of the desired lane situated at $y_{des}$. In Example 2, the ego vehicle's next maneuver is 90° turn to the left, which is characterized as the following constraint $C_E=\{\psi_E\geq\pi/2\}$. All initial conditions can be found such that the ego vehicle can collide with the contender during the horizon and satisfy the constraint $C_E$ by the end of the horizon.

Formally, given a fixed horizon T, an ego maneuver is specified by a constraint set $C_E\subseteq\mathcal{Z}_E$. The ego constraint can be enforced either at the end of the horizon or throughout the whole horizon. In Example 1, the latter is used, and maneuvers such as turning or overtaking can be defined similarly. The challenge, however, lies in capturing both collision-seeking, and maneuver-completing behavior in all possible permutations. This is challenging because it may require temporal reasoning that is not easily represented within typical HJ reachability formulations, as further discussed below.

Computing Perception Safety Zones with HJ Reachability: Example implementations can begin by using $z_E$ and $u_E$ to represent the dynamic state and control input of the ego vehicle, $z_C$ and $u_C$ to represent the dynamic state and control input of the contender, and z to represent their joint state. The actual state and input signals (e.g. X, Y coordinates, acceleration, steering, etc.) depend on how the specific problem is formulated. In particular, when symmetry can be utilized to reduce the state dimension, the HJ computation is simplified.

A generic perception safety zone may need to include all initial conditions from which the ego can collide with the contender within the horizon. When ego vehicle's next maneuver is given, attention can be focused on all possible ways that the ego can finish the maneuver, and any ego behavior that does not satisfy the maneuver specification can be ignored. The maneuver-based safety zone thus includes any initial condition from which the ego vehicle can finish the ego maneuver and incur a collision with the contender in the meantime.

Such a set in its raw form cannot be directly computed with HJ as it involves two separate tasks (goal reaching and collision seeking) that are not aligned, such that the optimal strategy for the two goals are different. To compute the zone, a "convolution"-style approach can be taken. In particular, the task can be separated into two phases: colliding with the contender at some point within the horizon, and using the remaining time to finish the maneuver.

The second phase can serve as a certification that the ego is indeed performing the maneuver. If the ego cannot finish the maneuver from the state and time the collision happens, it indicates that the ego behavior in the first phase is not part of a possible realization of the ego maneuver.

The second phase can be more easily computed with a low-dimensional reachability formulation, since only the ego vehicle is involved. For any given time $t<T$, suppose the collision happens at t, the second stage can be formulated as a simple reachability computation with boundary condition $C_E$ and horizon $T-t$, where $C_E$ is the goal set. It is well-established that the reachable set can be approximated with the viscosity solution of a HJB PDE:

$$V_E(z_E, T) = \mathcal{G}_E(z_E) \tag{5}$$

$$\frac{\partial V_E(z_E, t)}{\partial t} + \min\left\{0, \min_{u_E \in \mathcal{U}^E} \nabla_{z_E} V_E(z_E, t)^T f_E(z_E, u_E,)\right\} = 0.$$

where $\mathcal{G}_E(z_E)$ is the boundary value function such that $C_E\{z_E | \mathcal{G}_E(z_E) \le 0\}$, $f_E$ is the ego dynamics equation. Once $V_E$ is computed by solving the HJB PDE, $V_E(z_E, t)<0$ indicates that there exists a control strategy that brings $z_E$ to $C_E$ by time T, otherwise no such control strategy exists.

Given $V_E$, it can be noticed that once the timing of the collision is fixed and given, the reachable set of the following incident can be calculated: "the ego vehicle and the contender collide exactly at t and the ego finishes the maneuver before T. The reachable set of this specification can be computed with the following HJB PDE with horizon [0, t]:

$$\mathcal{G}(z) = \max\{V_E^{\uparrow}(z, t), \mathcal{G}_{col}(z)\} \tag{6}$$

$$\frac{\partial V(z, \tau)}{\partial \tau} + \min_{u_C \in \mathcal{U}^C} \min_{u_E \in \mathcal{U}^E} \nabla_z V(z, \tau)^T f(z, u_E, u_C) = 0$$

where $$V_E^{\uparrow}$$

is the lifting of $V_E$ from $Z_E$ (ego vehicle state space) to Z (joint state space of ego and contender), that is, any $z \in Z$ can be projected to $z_E \in Z_E$, and $$V_E^{\uparrow}(z) = V_E(z_E).$$

$G_{col}$ is a function such that $G_{col}(z) \le 0$ if two vehicles are in collision and positive otherwise, $u_C \in U^C$ is the control input of the contender. The above HJ formulation takes the maximum over $G_{col}$ and $V_E$ as the boundary condition, and the resulting V satisfies that for $\tau<t<T$, and $z(T)=z$, if $V(z,\tau)<0$, there exists a joint strategy between the ego and contender such that the ego and contender collide at time t and the ego is able to finish the maneuver before T.

Since t can take any value between 0 and T, we sweep through [0, T] and perform multiple HJB PDE computation, and index the resulting value function as $V^t$. $V^t(z)<0$ indicates that there exists a strategy such that the ego and contender collide at exactly t, and the ego is able to finish the maneuver before T Based on simple propositional logic, we have the following proposition.

It is proposed that the following two specifications are equivalent: (1) The ego collides with the contender and then finishes the maneuver within T, and (2) there exists a $t \in [0,T]$ such that the ego and contender collide at t, and the ego finishes the maneuver within [t,T].

The maneuver-based zone can then be computed in the form of a zero-sublevel set of the following value function:

$$V(z) = \min_{t \in [0,T]} V_t(z). \tag{7}$$

It is also proposed that letting $V^t$ be the solution of (6), and Vbe computed as in (7), then for any z, $V(z)<0$, there exists a time instance $0 \le t \le T$, a control signal of $u_E$ $[0, T] \to U^E$ and a control signal of $u_C$: $[0, t] \to U^C$ such that the ego and the contender collide at t and the ego finishes the maneuver before T. This proposition follows from HJ reachability theory and the convolution process that is derived above, and is a foundation of our maneuver-based safety zones in example embodiments.

As discussed herein, the introduction of maneuver-awareness i) maintains completeness of obstacle perception zones while ii) improving soundness. To this end, a Model Predictive Controller (MPC) simulation can be leveraged to validate that no combination of feasible initial conditions and ego trajectories result in collisions that were not identified by such a maneuver-aware obstacle perception zone. State-space volumes of the maneuver-based zones can be compared against zones derived without maneuver constraints to measure soundness improvements. A more precise definition of the maneuver-based zones is provided below.

Maneuver-Aware Zone Definition: Two prototypical maneuvers will now be discussed: a lane-change, and a rail-based 90-degree turn. It is noted that these two maneuvers are non-limiting examples for illustrative purposes only, and the maneuvers that can be employed with the disclosed approach are not so limited, and can include, for example, passing maneuvers (e.g., overtaking one vehicle through two lane changes), maneuvers involved in following traffic signs and traffic lights (e.g., stopping at a stop sign or red light), pulling over to allow an emergency vehicle pass, rerouting to avoid a pedestrian or bicycle, etc.

The lane-change example case can use a 3D model for the ego behavior:

$$\begin{bmatrix} \dot{y}_E & \dot{\psi}_E & \dot{v}_E \end{bmatrix}^T = \begin{bmatrix} v_E \sin(\psi_E) & \frac{v_E \tan(\delta_E)}{d_E} & a_E \end{bmatrix}^T. \tag{8}$$

where $y_E$, $\psi_E$, and $v_E$ are the lateral position, heading angle, and velocity of the ego, the inputs are the acceleration $a_E$ and steering $\delta_E$, $d_E$ is the wheel-base of the ego vehicle. The joint dynamics between the ego and the contender is described by a 7D dynamics:

$$\begin{bmatrix} \dot{x}_R \\ \dot{y}_E \\ \dot{y}_C \\ \dot{\psi}_E \\ \dot{\psi}_C \\ \dot{v}_E \\ \dot{v}_C \end{bmatrix} = \begin{bmatrix} v_C\cos(\psi_C) - v_E\cos(\psi_E) \\ v_E\sin(\psi_E) \\ v_C\sin(\psi_C) \\ \frac{v_E\tan(\delta_E)}{d_E} \\ \frac{v_C\tan(\delta_C)}{d_C} \\ a_E \\ a_C \end{bmatrix}. \tag{9}$$

where $x_R$ is the longitudinal distance between the ego and the contender, the contender state and inputs are named in the same way as the go with subscript C.

The Lane-Change maneuver completion condition is defined as in Example 1, with lane width 3.6 meters and lateral terminal offset of $\overline{\delta Y}=0.8$.

Figure 6:
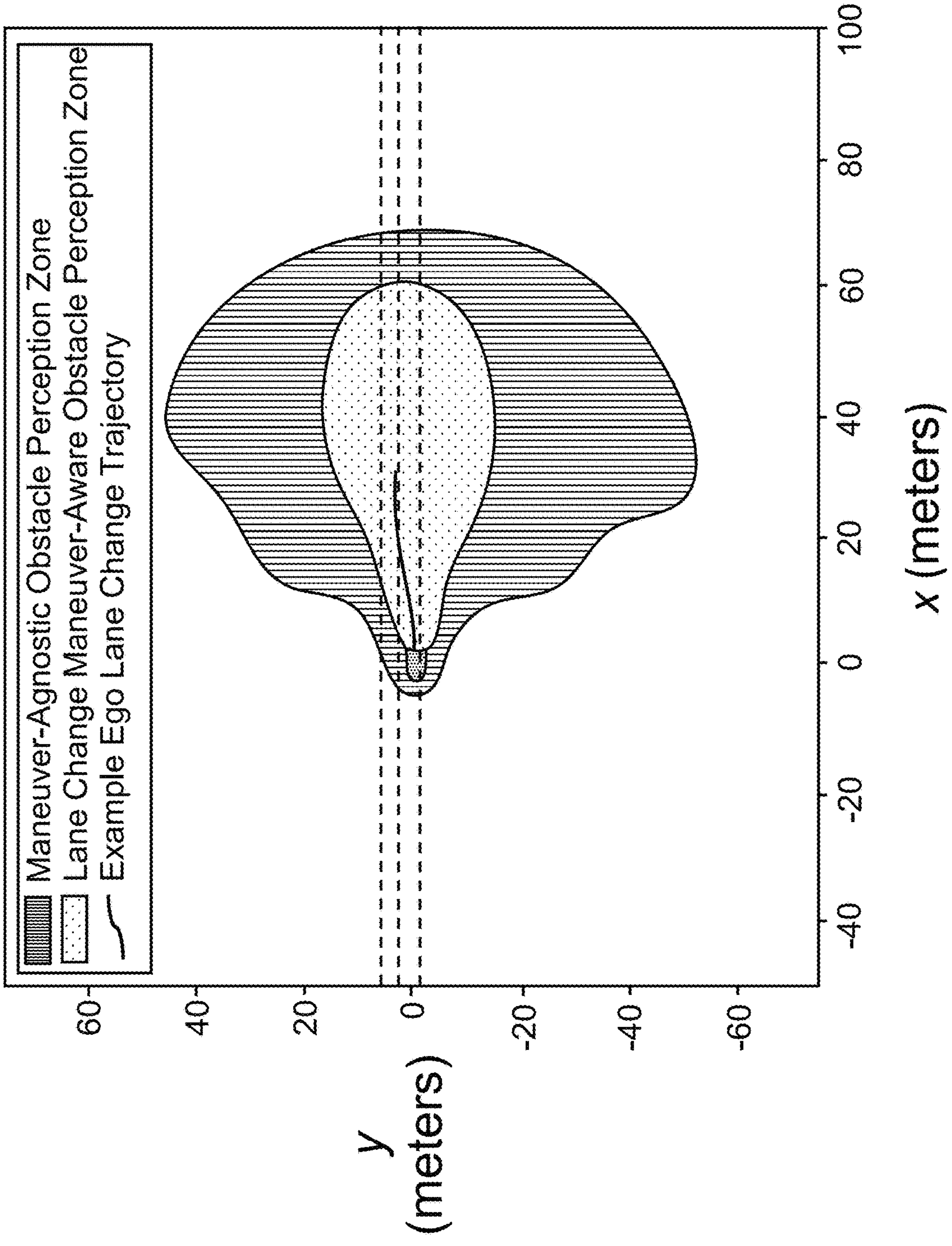
FIG. 6 illustrates that constraining ego vehicle dynamics to a family of lane change maneuvers during zone computation can reduce volume when compared to an unconstrained example according at least some embodiments of the present disclosure.

As illustrated in FIG. 6, incorporating maneuver-based decomposition in obstacle perception zone calculation can significantly improve soundness while maintaining desirable completeness properties. Constraining ego vehicle dynamics to a family of lane change maneuvers, for example, during zone computation can minimize volume when compared to an unconstrained example. An example of a valid lane change considered within the maneuver constraint is shown in black.

The rail-based maneuver is defined by constraining ego position and heading to a curve of varying curvature (function of heading angle). Maximum ego velocity is chosen such that the minimum curvature is feasible at the given maximum speed. For simplicity, a fixed turning radius of R=20 meters and maximum Ego speed at 10 meters per second were used. The ego dynamics is described by a 2D system:

$$\left[\dot{\psi}_E \;\; \dot{v}_E\right]^T = \left[v_E \mathcal{K}(\psi_E) \;\; a_E\right]^T. \tag{10}$$

where $\kappa(\bullet)$ is the curvature as a function of the heading angle, which is specified by the rail. The joint state space between the ego and the contender is described by a 6D dynamic system:

$$\begin{bmatrix} \dot{x}_R \\ \dot{y}_R \\ \dot{\psi}_E \\ \dot{\psi}_C \\ \dot{v}_E \\ \dot{v}_C \end{bmatrix} = \begin{bmatrix} v_C\cos(\psi_C) - v_E\cos(\psi_E) \\ v_C\sin(\psi_C) - v_E\sin(\psi_E) \\ v_E\mathcal{K}(\psi_E) \\ \dfrac{v_C\tan(\delta_C)}{d_C} \\ a_E \\ a_C \end{bmatrix}. \tag{11}$$

The completion condition can be defined by $\text{sign}(\psi_{des})(\psi_E - \psi_{des}) > 0$, where $\psi_{des}$ is target heading.

Demonstration of Completeness: Leveraging maneuver-based obstacle perception zones does not compromise completeness. Because obstacle perception zones reflect the possibility of a collision given a particular dynamic state, completeness of maneuver-based zones can be demonstrated using simulation data (as opposed to on real data that would require recording scenarios where real vehicle collisions occur). In example simulations, the ego-vehicle follows a fixed trajectory that is chosen to abide by appropriate dynamic constraints and maneuvers used in obstacle perception zone derivation. The contender can be simulated, for example, using an adversarial MPC controller that assumes constant ego velocity at each time step, and pursues a collision with a preview strategy. To select initial conditions, $\psi_E$ and $y_E$ can be fixed where applicable to 0, representing the start of a given maneuver. Sweeping over the remaining dimensions can provide a number of trials. The sweep can be performed uniformly, with the exception of the $x_R$, $y_R$ and $y_C$ coordinates which are sampled more densely closer to the ego vehicle.

With respect to terminology, true positives and true negatives indicate simulations in which both a zone and the simulation observe the same results: namely, either both or neither observe a collision (respectively). A false positive is a scenario in which a zone predicts a collision, but none are observed in the simulation. Note that an individual trial of a simulation only considers one possible ego-vehicle trajectory, while the disclosed reachability-based zones consider the family of all dynamically-feasible ego trajectories together. Moreover, an adversarial MPC controller may not be optimal (worst-case), constituting another source of false-positive cases. False positive results are thus expected from simulation experiments, and do not compromise the verification of completeness. False negatives indicate scenarios in which a zone fails to predict a collision that occurred in the simulation, indicating a zone is incomplete. Because the same dynamical models are used between the reachability-based zones and the simulation, some numerical error can be expected near zone boundaries that can result in false negatives. In practice, the dynamical models used in reachability-based zones are chosen to be conservative approximations.

Quantitative results can be found in Table 1, below. While no false negatives were observed in the lane change maneuver zone, there is a small number of failures in the turning maneuver zone. All of the observed failures occur very close to the zone boundary, occurring at an average value of 0.34 and a maximum of 1.34; it is noted that the safety zone is computed as the zero-sublevel set of the value function V. These values are small in the sense that all false negatives could be made to lie within the zone, becoming true positives, by simply inflating the threshold for ego/contender collision by a corresponding 1.34 meters (approximately half a car width). False negatives are reported to illustrate that, despite guaranteeing completeness, error stemming from, for example, coarse grid discretization in the numerical PDE solver, requires some additional safety buffer.

TABLE 1: Experimental results demonstrating completeness. High completeness consistency can be observed between reachability-based zones and simulation results, as can be seen by the low number of false negatives.

| Zone Name | Time Positive | True Negative | False Positive | False Negative |
|---|---|---|---|---|
| Lane Change | 12.4% | 59.5% | 18.1% | 0.0% |
| 90° Turn | 8.8% | 75.1% | 15.9% | 0.2% |

Figure 7:
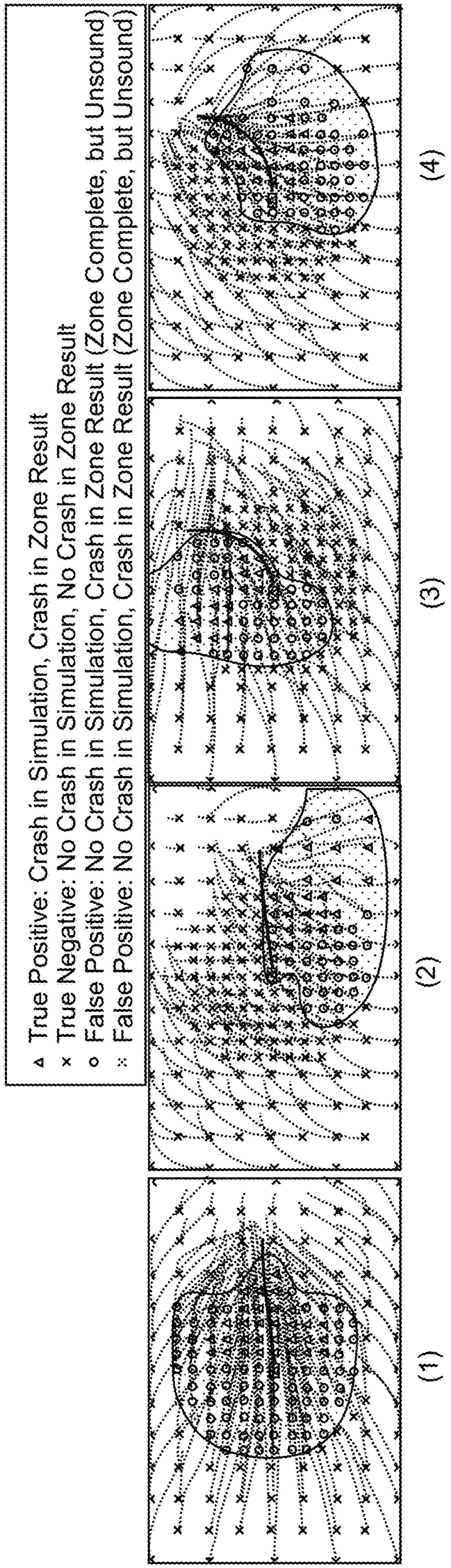
FIG. 7 provides a sampling of experimental results from maneuver-aware obstacle perception zone completeness verification, according at least some embodiments of the present disclosure.

FIG. 7 provides experimental results from maneuver-aware obstacle perception zone completeness verification, according at least some embodiments of the present disclosure. The obstacle perception zone can be observed as the enclosed shape in each box, and the simulated trajectory of the ego is represented by the solid line in each box. Other markers and trajectory lines show trajectories of different contender initial conditions as they simulate a collision attempt with the ego. A triangle marker indicates that simulation results matched the zone's behavior, while circle markers show cases where the zone was more conservative than the simulation. It is noted that this conservatism is expected, since each simulation trial only tests one possible ego trajectory, whereas the zones account for all dynamically feasible trajectories. Box (1) corresponds to a lane change maneuver with $v_E$=10 m/s, $v_C$=5 m/s, $\psi_C$=0 rad. Box (2) corresponds to a lane change maneuver with $v_E$=10 m/s, $v_C$=5 m/s, $\psi_C=\pi/2$ rad. Box (3) corresponds to a 90° turn maneuver with $v_E$=10 m/s, $v_C$=5 m/s, $\psi_E$=0 rad. And Box (4) corresponds to a 90° turn maneuver with $v_E$=10 m/s, $v_C$=5 m/s, $\psi_E=\pi/2$ rad.

Demonstration of Soundness: While completeness is not compromised, maneuver-awareness increases soundness of the disclosed safety zones. This can be seen in Table 2, which compares state space volume between maneuver zones and a baseline derivation in which the maneuver constraint is removed. This baseline zone effectively represents the union of all dynamically feasible maneuvers over the derivation time horizon. The results show that a 3× to 4× state space volume reduction can be achieved compared to the baseline approach by considering maneuver constraints.

TABLE 2: A comparison of different obstacle perception zone volumes before and after maneuver-awareness is considered within the derivation. A significant reduction in state space volume is observed when applying maneuver-based decomposition to safety zones. In a V&V setting, this indicates a commensurate optimization in the performance requirement targets of an autonomous vehicle.

| Zone Name | Volume Compared to Baseline |
|---|---|
| Baseline | 100.0% |
| Lane Change | 30.3% |
| 90° Turn | 24.0% |

Disclosed herein is a maneuver-based decomposition of perception safety zones that leverages a temporal convolution operation with the capability to account for collision at any intermediate time along the way to maneuver completion. A significant reduction in zone volume can be achieved while maintaining completeness, thus optimizing obstacle perception performance requirements by filtering out regions of state space not relevant to an AV's route.

One example use case is in constructing a holistic risk assessment of an autonomous vehicle obstacle perception system, with a precise zone mapping for each maneuver context yielding adaptive, and overall less stringent, performance targets. Beyond reducing over-conservatism (e.g., improving soundness while maintaining completeness) in validating existing perception systems, these zones can also be used in developing such systems. For example, zone geometry and associated coverage analysis may be used to inform sensor placement, range requirements, or even to toggle sensor activation/field of view according to perception requirements in certain directions. For standard deep-learning-enabled perception systems, safety zones can also be used during training to weight the loss function to prioritize high recall within the zone. While the discussion focused on autonomous vehicle maneuvers, the disclosed approach may be applied more broadly, for example, (i) to other perception-equipped cyber-physical systems operating in interactive environments such as autonomous drones or robotic arms, and (ii) to address more general temporal dependencies in reachability analysis (e.g., considering an accumulated comfort metric in addition to safety).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:

one or more circuits to:

obtain sensor data corresponding to one or more objects in a first volume of space perceivable by an autonomous system;

determine one or more values of one or more parameters corresponding to one or more predicted trajectories associated with an intended maneuver of the autonomous system;

generate, using the sensor data and based at least on conditioning the generation on the one or more values of the one or more parameters, an obstacle perception zone corresponding to a second volume of space, smaller than and within the first volume of space, containing potential threats to the autonomous system and excluding one or more regions of the first volume of space that are not relevant to the one or more predicted trajectories; and based at least on potential threats detected within the obstacle perception zone:

performing one or more maneuvers by transmitting control signals to at least one of a propulsion system, a steering system, or a brake system of the autonomous system; and/or transmitting, to one or more control circuits, data corresponding to the one or more maneuvers for performance of the one or more maneuvers by the one or more control circuits via control signals to at least one of the propulsion system, the steering system, or the brake system.

2. The at least one processor of claim 1, wherein the obstacle perception zone is generated, at least in part, by performing temporal convolution that models temporal dependencies between state goals.

3. The at least one processor of claim 2, wherein the temporal dependencies correspond to potential collisions during the intended maneuver.

4. The at least one processor of claim 1, wherein the obstacle perception zone is generated so as to account for a collision at any intermediate time along the way to maneuver completion.

5. The at least one processor of claim 1, wherein the obstacle perception zone is generated, at least in part, using a Hamilton-Jacobi (HJ) reachability formulation constrained by the intended maneuver.

6. The at least one processor of claim 1, wherein the obstacle perception zone is generated, at least in part, by executing a Hamilton-Jacobi-Bellman (HJB) equation.

7. The at least one processor of claim 1, wherein the obstacle perception zone is generated, at least in part, by filtering out regions of space not relevant to a route of the autonomous system.

8. The at least one processor of claim 1, wherein the obstacle perception zone corresponds to regions of space in which it is possible for the autonomous system to collide with one or more other actors.

9. The at least one processor of claim 1, wherein the intended maneuver comprises a change in position of the autonomous system.

10. The at least one processor of claim 1, wherein the intended maneuver comprises a change in direction of the autonomous system.

11. The at least one processor of claim 1, wherein the at least one processor is comprised in at least one of:

a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

12. A system comprising:

one or more processing units to perform operations comprising:
obtaining sensor data corresponding to a sensory perception zone of a machine;
determining one or more values of one or more parameters corresponding to one or more predicted trajectories associated with an intended maneuver of the machine;
generating, using the sensor data and based at least on conditioning the generation on the one or more values of the one or more parameters, an obstacle perception zone identified within the sensory perception zone based at least on potential threats to the machine, and excluding one or more regions of the sensory perception zone that are not relevant to the one or more predicted trajectories;
performing one or more perception operations, using a subset of the sensor data corresponding to the obstacle perception zone, to generate one or more perception outputs; and
based at least on the one or more perception outputs:
performing, using the machine, one or more control operations by transmitting control signals to at least one of a propulsion system, a steering system, or a brake system of the machine; and/or
transmitting, to one or more control circuits, data corresponding to the one or more operations for performance of the one or more control operations by the one or more control circuits via control signals to at least one of the propulsion system, the steering system, or the brake system of the machine.

13. The system of claim 12, wherein the generating the obstacle perception zone comprises performing temporal convolution that models temporal dependencies between state goals, wherein the temporal dependencies correspond to potential collisions during the intended maneuver.

14. The system of claim 12, wherein the obstacle perception zone is determined so as to account for a collision at any intermediate time along the way to maneuver completion.

15. The system of claim 12, wherein the generating the obstacle perception zone comprises a Hamilton-Jacobi (HJ) reachability formulation constrained by the intended maneuver.

16. The system of claim 12, wherein the system is comprised in at least one of:

a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for generating or presenting at least one of augmented reality content, virtual reality content, or mixed reality content;
a system for hosting one or more real-time streaming applications;
a system implemented using an edge device;
a system implemented using a robot;
a system for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

17. A method comprising:

processing, using one or more processing units of a machine, sensor inputs corresponding to a sensory field of view captured by one or more sensors of the machine;
identifying, using the one or more processing units and based at least on an input from a path planning module or a user, one or more intended maneuvers of the machine;
determining one or more values of one or more parameters corresponding to one or more predicted trajectories associated with the one or more intended maneuvers of the machine;
reducing, using the one or more processing units and the sensor inputs, based at least on conditioning the reduction on the one or more values of the one or more parameters, the sensory field of view of the machine to an obstacle perception zone containing potential threats to the machine, thereby filtering out regions of space that are not relevant to the one or more predicted trajectories to reduce requirements for computational resources; and based at least on potential threats detected in the obstacle perception zone using the one or more processing units, performing, by the machine, an intended maneuver of the one or more intended maneuvers by transmitting control signals to at least one of a propulsion system, a steering system, or a brake system of the machine, and/or transmitting, to one or more control circuits, data indicative of the intended maneuver to enable the one or more control circuits to perform the intended maneuver by sending control signals to at least one of the propulsion system, the steering system, or the brake system.

18. The method of claim 17, wherein the reducing the sensory field of the machine to the obstacle perception zone comprises performing temporal convolution that models temporal dependencies between state goals.

19. The method of claim 18, wherein the temporal dependencies correspond to potential collisions during the intended maneuver.

20. The at least one processor of claim 1, wherein the obstacle perception zone is generated based on an interaction dynamics model that accounts for a plurality of dynamically-feasible trajectories of the one or more objects relative to the one or more predicted trajectories of the intended maneuver.

* * * * *